United States Patent
Madonna

(10) Patent No.: US 6,522,646 B1
(45) Date of Patent: *Feb. 18, 2003

(54) EXPANDABLE TELECOMMUNICATIONS SYSTEM

(75) Inventor: Robert P. Madonna, West Barnstable, MA (US)

(73) Assignee: Excel Switching Co., Hyannis, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/343,949

(22) Filed: Jun. 30, 1999

Related U.S. Application Data

(62) Division of application No. 09/137,496, filed on Aug. 20, 1998, now Pat. No. 6,118,779, which is a division of application No. 08/455,935, filed on May 31, 1995, now Pat. No. 5,864,551, which is a division of application No. 08/207,931, filed on Mar. 8, 1994, now Pat. No. 5,544,163.

(51) Int. Cl.[7] .......................... H04L 12/56; H04L 12/66
(52) U.S. Cl. ...................................... 370/353; 370/401
(58) Field of Search .................................. 370/352, 353, 370/354, 355, 389, 396, 400, 401, 402, 403, 404, 406, 407, 408, 395.1; 340/825.03, 826, 825.5, 825.51, 825.52, 825.79, 825.83, 825.89; 379/268, 269, 271, 272, 273; 709/208, 223, 224, 238, 251, 253

(56) References Cited

U.S. PATENT DOCUMENTS

| 4,038,638 A | 7/1977 | Hwang ........................ 340/166 |
| 4,173,713 A | 11/1979 | Giesken et al. ................ 179/18 |
| 4,228,536 A | 10/1980 | Gueldenpfenning ......... 370/66 |
| 4,229,816 A | 10/1980 | Briedenstein et al. ....... 370/100 |
| 4,456,987 A | 6/1984 | Wirsing ........................ 370/58 |
| 4,501,021 A | 2/1985 | Weiss .......................... 455/601 |

(List continued on next page.)

FOREIGN PATENT DOCUMENTS

| EP | 0119105 | 9/1984 |
| EP | 0256526 | 7/1988 |
| FR | 2538662 | 12/1962 |
| GB | 1243464 | 8/1971 |

Primary Examiner—Alpus H. Hsu
(74) Attorney, Agent, or Firm—Cesari & McKenna, LLP

(57) ABSTRACT

An open, high speed, high bandwidth digital communication network for connecting multiple programmable telecommunications switches to form a large capacity, non-blocking switching system. Each network switching node includes circuitry for transmitting and receiving variable-length, packetized information over the network, thus enabling each node to receive information from or transmit information to all other nodes. The network may carry any type of information present in the system including voice, data, video, multimedia, control, configuration and maintenance, and the bandwidth of the network may be divided or shared across various information types. Devices such as voice processing resources may also interface with the network, thereby gaining direct access to all information passing through the network. Also provided are methods and packet structures for communicating information over the network. Multiple networks may be interconnected to provide even greater switching capacity or voice processing capacity.

94 Claims, 34 Drawing Sheets

U.S. PATENT DOCUMENTS

| | | | |
|---|---|---|---|
| RE31,852 E | 3/1985 | Soderbloom | 370/90 |
| 4,527,012 A * | 7/1985 | Caplan et al. | 179/18 ES |
| 4,539,676 A | 9/1985 | Lucas | 370/60 |
| 4,547,880 A * | 10/1985 | De Vita et al. | 370/91 |
| 4,569,041 A * | 2/1986 | Takeuchi et al. | 370/60 |
| 4,686,330 A | 8/1987 | Hourton | 379/269 |
| 4,757,497 A * | 7/1988 | Beierle et al. | 370/89 |
| 4,792,947 A | 12/1988 | Takiyasu et al. | 370/86 |
| 4,805,172 A | 2/1989 | Barbe et al. | 370/68.1 |
| 4,962,497 A * | 10/1990 | Ferenc et al. | 370/60.1 |
| 5,003,533 A | 3/1991 | Watanabe | 370/258 |
| 5,008,663 A | 4/1991 | Adams | 340/825.5 |
| 5,029,199 A | 7/1991 | Jones et al. | 379/89 |
| 5,051,987 A | 9/1991 | Conlon | 370/60 |
| 5,105,424 A | 4/1992 | Flaig et al. | 370/94.1 |
| 5,111,198 A | 5/1992 | Kuszmaul | 370/94.1 |
| 5,119,370 A | 6/1992 | Terry | 370/60.1 |
| 5,151,900 A | 9/1992 | Snyder et al. | 370/94.3 |
| 5,253,252 A | 10/1993 | Tobol | 370/85.13 |
| 5,278,848 A | 1/1994 | Yamaguchi | 370/258 |
| 5,349,579 A * | 9/1994 | Madonna et al. | 370/58.2 |
| 5,353,283 A | 10/1994 | Tsuchiya | 370/60 |
| 5,477,530 A | 12/1995 | Ahmadi et al. | 370/484 |
| 5,477,547 A | 12/1995 | Sugiyama | 370/200.11 |
| 5,542,047 A | 7/1996 | Armstrong | 395/200.11 |
| 5,661,720 A | 8/1997 | Taniguchi | 370/403 |
| 5,923,643 A * | 7/1999 | Higgins et al. | 370/218 |

* cited by examiner

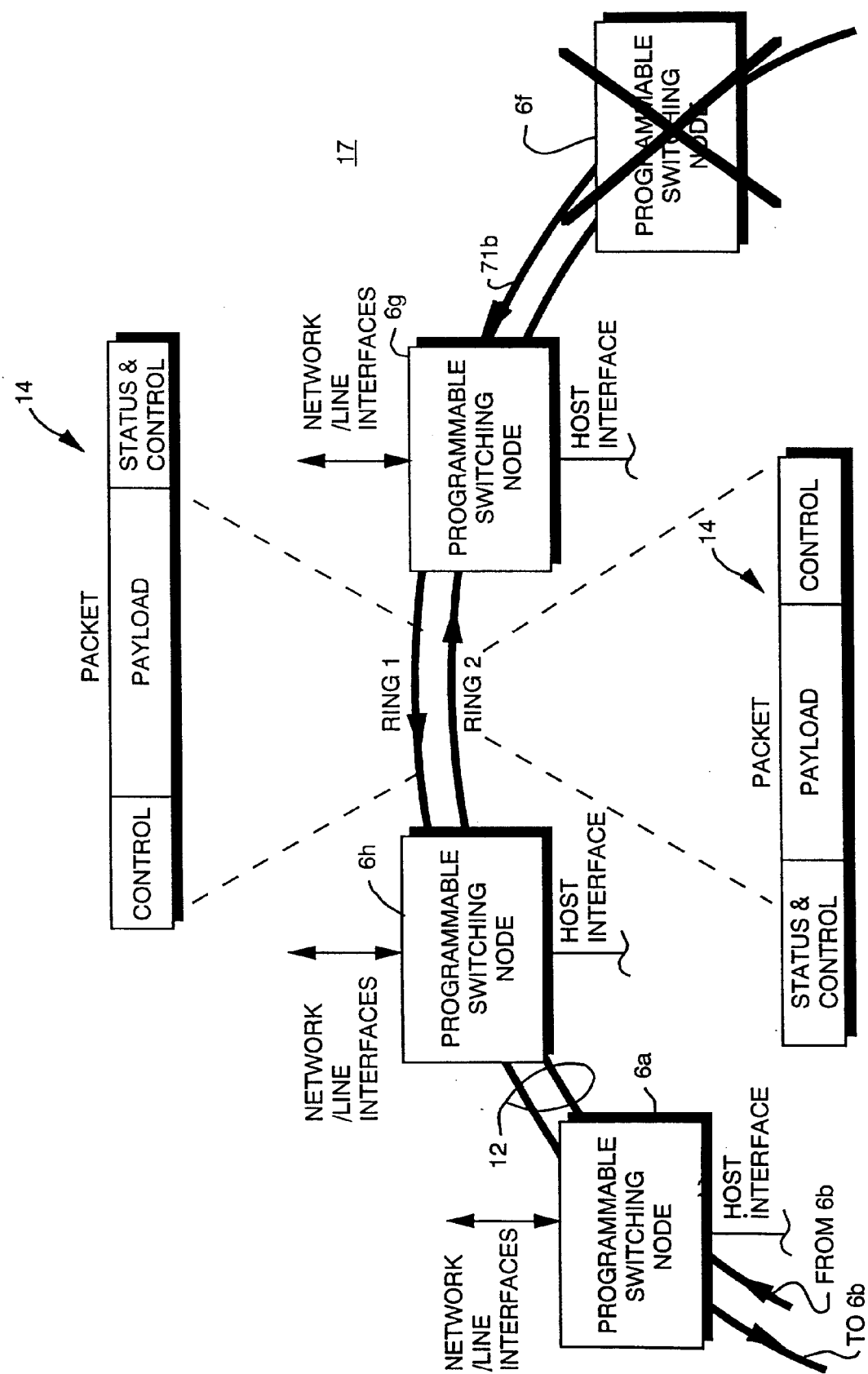

EXPANDABLE TELECOMMUNICATIONS SYSTEM

RELATED APPLICATIONS

This application is a divisional of Ser. No. 09/137,496, filed Aug. 20, 1998, now U.S. Pat. No. 6,118,779, which is a divisional of Ser. No. 08/455,935, filed May 31, 1995, now U.S. Pat. No. 5,864,551, which is a divisional of Ser. No. 08/207,931, filed Mar. 8, 1994, now issued as U.S. Pat. No. 5,544,163.

FIELD OF THE INVENTION

The present invention relates generally to the field of telecommunications and, more specifically, to an architecture for connecting a plurality of programmable telecommunications switches to provide an expandable switching system and direct access for diverse communications applications.

BACKGROUND OF THE INVENTION

A fundamental consideration in any telecommunications system design is switching capacity. Switching capacity must be analyzed in terms of current demand and projected demand in order to find a solution that is cost effective for both present and future service. For example, assume that a developing country is in the process of building a basic telecommunications system and intends to provide service to most of its current population. Such a population is most likely geographically distributed among small areas of high density (cities) and larger areas of low density (suburban and rural). In addition, the population is probably growing, but at different rates in different areas. Thus, the challenge for a telecommunications system designer is to provide sufficient switching capacity to support satisfactory service to most or all of the population while also anticipating likely increases in future demand and providing for economical expansion.

Another example of the difficulty of providing appropriate switching capacity involves wireless or personal communications network (PCN) applications. These types of applications are based on micro-cellular architectures which require numerous base-stations, in close physical proximity across a metropolitan area, with different switching capacities which aggregate to a large capacity.

A second fundamental consideration in telecommunications system design is providing for the addition of new features or services in the future. Telecommunications equipment and service continues to evolve rapidly, due in large part to the advent of digital technology. Even more dramatic advances are likely in the future, particularly as previously separate industries such as cable television and local telephone operating companies integrate their services. Again, the challenge is to create a system which economically serves a present need, while also providing flexible and inexpensive ways to integrate new features and services as they become available.

Of the conventional approaches to the dual problems of providing adequate switching capacity along with access for new features and services, most, if not all, suffer from one or both of two major disadvantages: (1) there is insufficient bandwidth in the system to handle information such as video or multimedia (in addition to voice and data), (2) there is no direct, ready access to all of the information passing to or from the system, meaning there is no way to capture all of the information and distribute it to other switching systems or equipment, and (3) an increasingly large central switch is required to provide access to some types of enhanced services.

One conventional approach may be referred to, for shorthand, as the "bus extension" approach. In many conventional telecommunications switches, one or more internal buses are provided for carrying information, including voice, data and control information, between various parts of the switch. Buses are well suited for carrying such information since, by definition, multiple devices (e.g., circuit boards or cards) may interface with the buses and share them in accordance with a defined communication protocol. In a telecommunications switch, it is typical to find one or more buses interconnecting a series of cards which physically terminate telephone lines or trunks with other cards which perform switching, control or other functions.

As the shorthand name suggests, the concept underlying the bus extension approach is simply to connect additional cards, which provide additional switching capacity or other functions, with the existing buses. In addition to the two major disadvantages noted above, there are several other disadvantages to this approach. First, there are physical limitations as to the number of cards that can be physically connected to or share the buses without degrading the system's performance. Second, in order to permit significant future expansion, the buses and other portions of the system must be constructed, in the first instance, to handle far greater traffic than is required prior to any expansion of the system. These limitations are related to the electrical and mechanical characteristics of the buses (or perhaps a particular one of the buses) and their effective operating speeds. Attempts to overcome these limitations (e.g., using an excessively large number of connections to the bus) tends to increase the cost and complexity of the "base" or unexpanded system, possibly rendering the system too costly for some applications. There is also a limitation related to the processing power required to actually performing the switching functions as well as control traffic on the buses.

Third, the bus structures found in many, if not most, conventional switching systems are generally designed solely for carrying out basic call processing and switching functions and do not provide ready, direct access to the ports for integrating new features and services.

Fourth, the bus structures are typically incapable of carrying packet switched data or other types of information.

A second approach may be referred to as the "modular" approach for shorthand. In the modular approach, the concept is to provide a switching system which is constructed from a series of essentially identical modules. Each module provides a finite amount of switching capacity which may be added to an existing system (one or more at a time) to increase the overall capacity of the system.

Again, in addition to the major disadvantages noted earlier, the modular approach has other deficiencies. In order to provide fully non-blocking operation, each and every module as built must have the capability to receive circuit switched data from every other module up to whatever the maximum number of modules may be. In terms of hardware, this means that each module must be built with a sufficiently large memory to hold the maximum amount of circuit switched data which could be received if the maximum number of modules are connected together. For example, if each module is capable of switching the equivalent of 64 ports and a maximum of eight modules may be connected together, then each module must necessarily contain a memory capable of holding circuit switched data for (8×64)=512 ports. Thus, in the modular approach, it is the maximum switching capacity of the fully expanded system which determines the size of the memory that each module must have. For larger systems (i.e., on the order of a few thousand ports or larger), constructing such a memory becomes impractical due to both the accompanying number of physical network/line interfaces as well as the additional circuitry needed to control the memory.

Second, in order to maintain a truly "modular" system, it is impossible to vary the switching capacity of individual modules.

Third, like the bus extension approach, the modular approach is oriented toward performing basic switching operations and does not generally offer direct access to all the ports nor the capability of handling packet switched data or other types of information.

SUMMARY OF THE INVENTION

In brief summary, the present invention provides an open, high speed, high bandwidth digital communication network for connecting multiple programmable telecommunications switches to form a large capacity, non-blocking switching system. In a preferred embodiment, the network is implemented using one or more rings which provide a medium for transferring information over the network, and a plurality of programmable switches, each of which appears as a node on the network and serves a group of ports. Additional switches (nodes) may be added to the network as desired to increase the system's switching capacity.

Each node includes circuitry for transmitting and receiving variable-length, packetized information over the network, thus enabling each node to receive information from or transmit information to all other nodes. The network may carry any type of information present in the system including voice, data, video, multimedia, control, configuration and maintenance, and the bandwidth of the network may be divided or shared across various information types.

In addition, devices or resources other than programmable switches may also act as nodes on the network, thereby gaining direct access to all information passing through the network. More specifically, voice processing resources such as voice mail/message systems or other enhanced services platforms may, by becoming nodes, gain direct access to all ports served by the system without the need for a large central switch. The present invention's ability to transfer information of any type, in a readily usable form, at high speed across the network enables any service, feature or voice processing resource which is available at a given node to be provided to any port of the same or any other node.

The present invention also provides methods and packet structures for communicating information over the network. In general, different packet structures are provided for communicating circuit switched information, voice processing information, data or maintenance information. However, all packets contain a control portion or header, which typically includes address, status and other control information, and a payload portion for carrying data. The combination of direct access to all ports and the ability to transfer information in packet form is highly compatible with asynchronous transfer mode (ATM) operation on SONET networks.

In accordance with one method of transferring information between nodes, each node uses the network to transmit one or more packets, each of which has an "empty" payload, which are received first by an adjacent node. The adjacent node determines the source of the received packet and the packet's status by the information contained in the control portion of the packet. If that adjacent node has information to send to the node which transmitted the packet, the adjacent node inserts such information into the payload of the packet, then allows the packet to pass to the next adjacent node on the network. If the adjacent node has no information for the node that originated the packet, the packet simply passes to the next adjacent node on the network. This process is repeated at each node until the packet traverses the complete network and returns with a "full" payload to the node from which it originated. At that point, information which was inserted into the packet by other nodes is captured by the node which originated the packet. In turn, each node transmits an "empty" packet which traverses the network and returns with information from other nodes. In this fashion, information of any type originating from any port served by any node may be transferred to any other port of the same or different node in the system.

In accordance with an alternative method of transferring information between nodes, each node uses the network to transmit one or more packets, each of which has a "full" payload that contains information originating from that node. Each such packet is initially received by an adjacent node which determines the origin of the packet and whether any of the information contained therein is needed by that adjacent node. If so, such information is captured from the payload before the packet passes to the next adjacent node. If no information is needed, the packet simply passes to the next adjacent node. Again, this process is repeated until each node on the network has transmitted one or more packets with a "full" payload and each such packet has traversed the complete network, thereby allowing each node access to the information originated by each other node.

By operating in accordance with either (or both) of the inventive methods of transferring information, the capacity of each node to transfer information over the network may be advantageously established independently from the other nodes. Further, a given node need only contain a memory which is sufficiently large to accommodate that node's switching (or voice processing) capacity and not the entire capacity of the system.

In another embodiment of the present invention, a second ring is used to connect all of the nodes, thereby providing a second network. The second network effectively doubles the maximum switching capacity of the system and also provides fault isolation in the event of a failure of the first network or one of the nodes.

In another embodiment of the present invention, one or more additional networks are added to the nodes, further increasing the maximum switching capacity of the system and providing redundancy.

In yet another embodiment of the present invention, one or more nodes may be used to "bridge" one network to another. A bridge node is common to two networks and is capable of exchanging information bidirectionally between such networks. A bridge node may also be used to connect networks which operate at different speeds.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 6A and 6B are a block diagram of an expandable telecommunications system which shows how communication may be maintained in event of a failure of one of the programmable switching nodes or a portion of the inter-nodal network;

DETAILED DESCRIPTION OF AN ILLUSTRATIVE EMBODIMENT

Figure 1A:
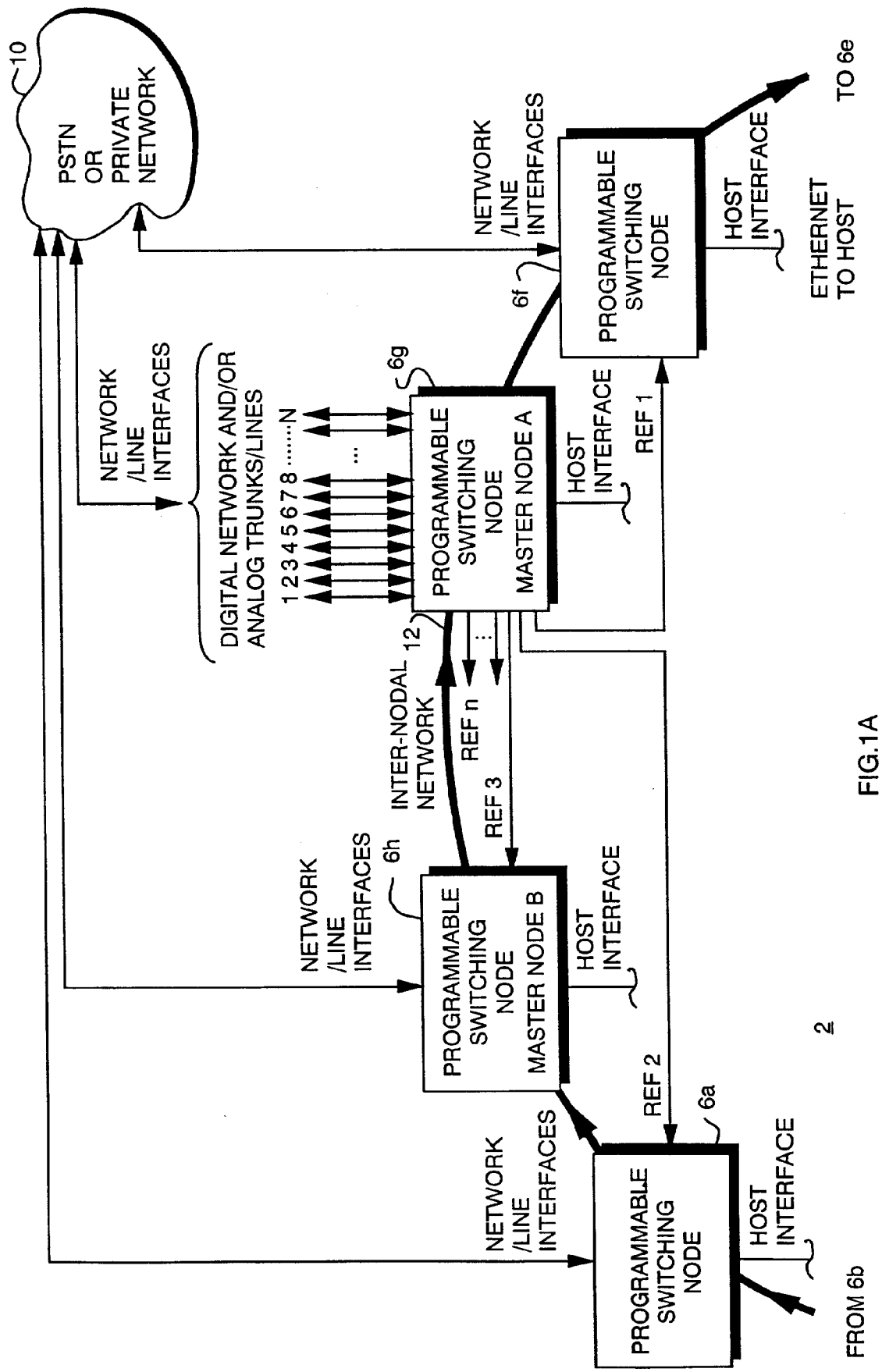
FIGS. 1A and 1B are a block diagram of an expandable telecommunications system which employs a ring-type inter-nodal network to transfer information between programmable switching nodes, all of which is constructed in accordance with a preferred embodiment of the present invention.
Figure 1B:
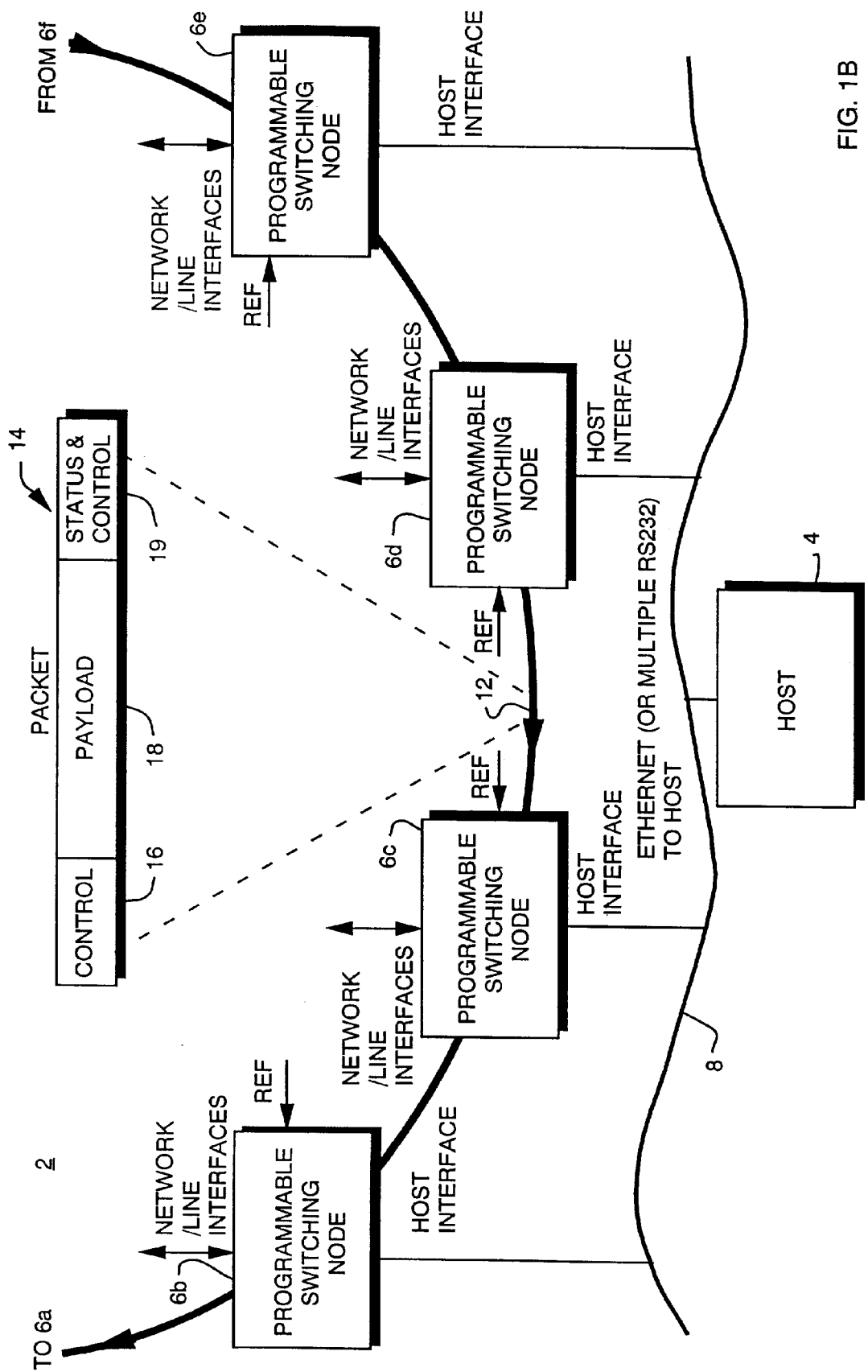

FIGS. 1A and 1B show a large capacity, expandable, fully programmable telecommunications switching system 2. The system 2 includes a host 4 and a series of programmable switching nodes 6a–6h. Each of nodes 6a–6h includes a host interface which is connected in communicating relationship with host 4 by a local area network (LAN) such as Ethernet or by multiple asynchronous communication (RS-232) links 8. It should be understood that other types of host/node interfaces may be used instead of or in addition to the LAN/RS-232 links 8. Although only a single host 4 is shown, use of LAN 8 to provide host/node communications permits multiple hosts to control the system 2 (or parts thereof) by configuring each host as a "client" and each node as a "server." For purposes of improved clarity in this drawing, the host interfaces of nodes 6a and 6f–6h are truncated.

Each of nodes 6a–6h includes digital network/line interfaces for connection with the public switched telephone network (PSTN) or a private network 10. The term "private network" is intended in a broad sense to refer to any network or line or other interface other than the PSTN. Again, for enhanced clarity, the network/line interfaces of nodes 6b–6e are truncated. As shown by representative node 6g, the network/line interfaces may terminate either digital networks or analog trunks/lines, or combinations of both types. The network/line interfaces of a given node may include suitable interfaces for performing communications using ATM, Signaling System 7 (SS7), ISDN, T1/robbed bit, E1/CAS or other communication protocols.

Node 6g is nominally designated "master node A" (active master node) and node 6h is nominally designated "master node B" (standby master node for redundancy). A synchronization reference line (ref 1 . . . ref n) extends from active master node 6g to each other switching node, although some such lines are truncated for clarity. As is explained in detail below in connection with FIGS. 3A through 3E, any of nodes 6a–6h may be configured as the active master node or the standby master node. However, at any given time, there may be one and only one active master node.

Nodes 6a–6h are connected together by an inter-nodal network 12 which provides for high speed, high bandwidth digital communications between the nodes. As illustrated, inter-nodal network 12 may be implemented using a ring which enables each of nodes 6a–6h to exchange packetized information with each other node served by network 12. Inter-nodal network 12 may also be implemented with any of a variety of other types of communications networks, including Ethernet or other types of LANs, wireless communications networks and the PSTN (ATM/SONET). Using the PSTN for inter-nodal network 12 permits the nodes to be geographically distributed over large areas.

A general packet structure 14 for exchanging information over the inter-nodal network 12 consists of a control portion 16, a payload portion 18 and a status and control portion 19. Details of various packet structures for transferring different types of information are described below in connection with FIG. 1E.

Using inter-nodal network 12, a port of any given node may be connected to any other port of the same node or any other node in a fully non-blocking manner. In this preferred embodiment, with a total of eight switching nodes 6a–6h interconnected by the inter-nodal network 12, if all of the bandwidth of the inter-nodal network 12 is used for transferring circuit switched data, the system 2 is capable of switching (8×2,048=) 16,384 ports, which equates to 8,192 simultaneous, two-way calls.

It should be understood that each of nodes 6a–6h operates independently with respect to the network/line interfaces terminated thereon. That is, any node may be removed or added to inter-nodal network 12 without impairing the operations or network/line interfaces of the other nodes. Further, the switching capacity of each switching node may be established independently from the switching capacities of other nodes (i.e., "small" switches may be combined with "large" switches on the same inter-nodal network 12). Thus, the overall switching capacity of the system 2 may be increased simply by adding additional switching nodes to the inter-nodal network 12, subject to certain limitation regarding the data transmission rate of that network, or additional inter-nodal networks 12 which are discussed below.

The overall operation of system 2 is controlled by host 4, which is commonly implemented with a personal computer (PC), workstation, fault tolerant or other computer on which a user's application software runs. Host 4 and each of nodes 6a–6h exchange messages over LAN/RS-232 links 8. Such messages are typically used to configure the nodes as well as direct call processing functions such as making connections and providing communications services (i.e., tone detection, tone generation and conferencing).

Figure 1C:
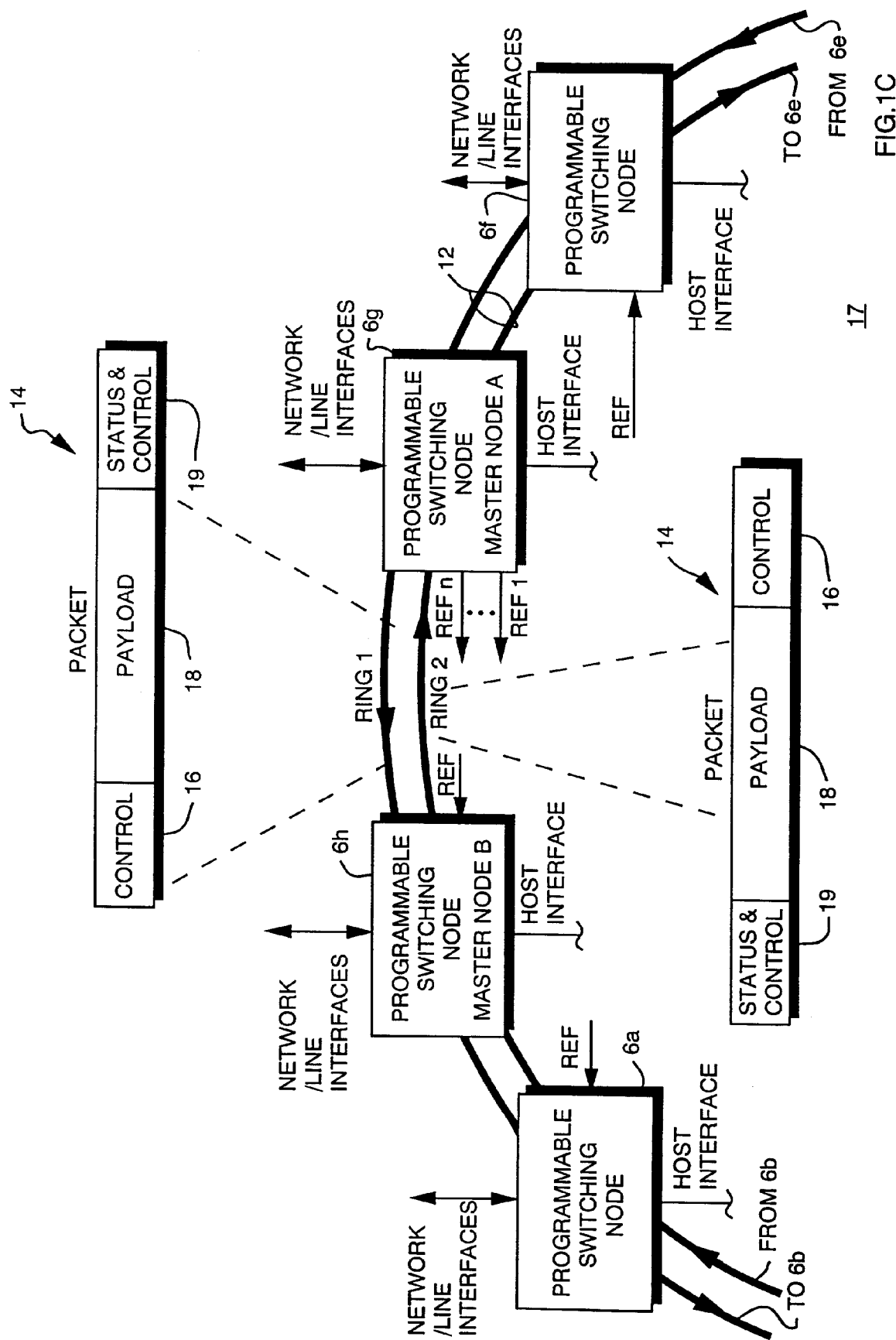
FIGS. 1C and 1D are a block diagram of another embodiment of the present invention which employs a two-ring inter-nodal network to transfer information between programmable switching nodes.
Figure 1D:
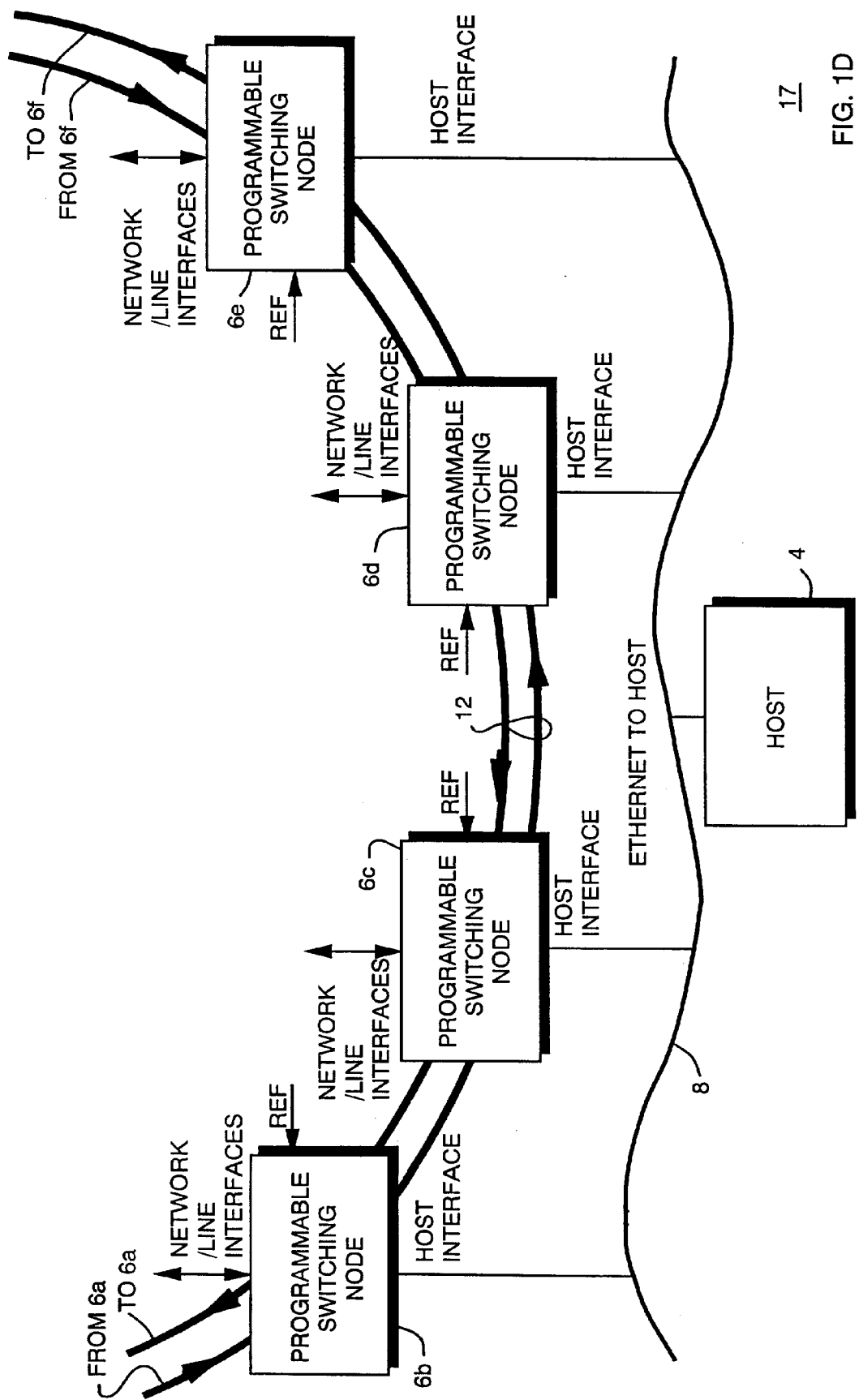

FIGS. 1C and 1D show an expandable telecommunications switching system 17 to which is similar to system 2 of FIGS. 1A and 1B, except that two rings are used to form the inter-nodal network 12 which connects nodes 6a–6h. PSTN/private network 10 is omitted for clarity. Throughout the remaining figures, the same reference numbers will be used to designate similar components or steps. Conceptually, each of the two rings may be considered a separate inter-nodal network (or, alternatively, may be considered separate channels within a single network) since information may be transferred between nodes using either ring independently from the other, thereby effectively doubling the maximum switching capacity as compared to that of system 2. Also, use of two rings provides fault isolation for the system 17. That is, should one ring fail (which would render the entire, single ring system 2 inoperable), the second ring may continue to transfer information between nodes, thereby keeping the system 17 at least partially operational.

Figure 1E:
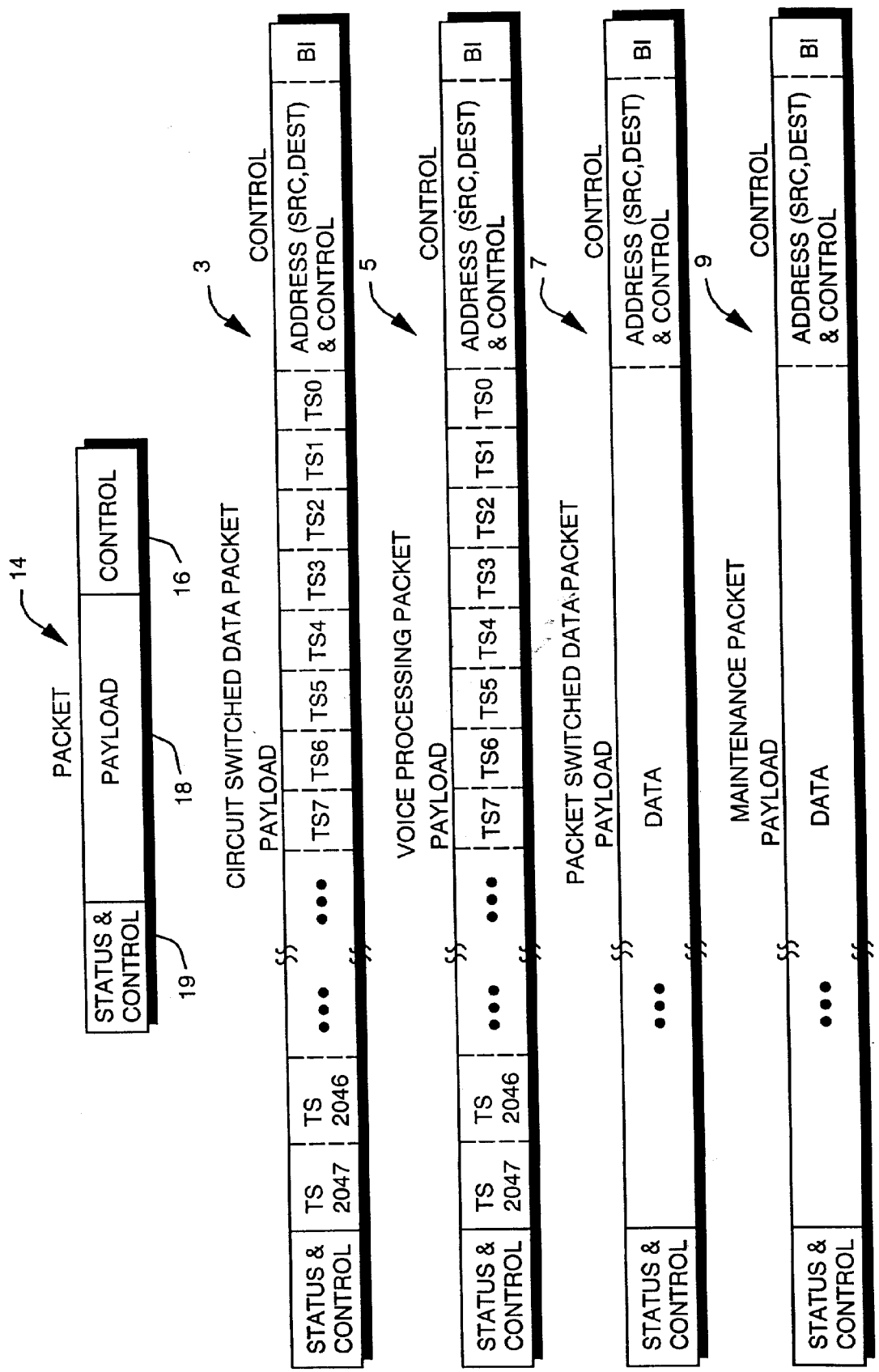
FIG. 1E shows various types of packets which may be used to transfer information over the networks of FIGS. 1A through 1D.

FIG. 1E shows preferred embodiments for several packets which may be used to transfer information over inter-nodal network 12. A circuit switched data packet 3 and a voice processing packet 5 are similarly constructed and each includes a control portion which contains a busy indicator (BI) followed by address and control information. The busy indicator may be used, as described in detail below, to denote the current status of a given packet as either "busy" (meaning the packet may not be used by a node to transfer information) or "free".

The address information preferably includes an address for either the source (SRC) node from which the packet originates or the destination (DEST) node for which the packet is intended, or both. Each address (source or destination) preferably includes a "network address" which uniquely identifies a particular inter-nodal network. Such identification is necessary since, as described below, multiple inter-nodal networks may be used to connect the same or different groups of nodes. Each address (source or destination) preferably also includes a "nodal address" which uniquely identifies a particular node on a particular inter-nodal network. Additional address information may include an explicit "port address" for uniquely identifying a particular port or groups of ports.

In general, packets 3 and 5, which carry circuit switched data, require "port addresses" since such data is subject to distribution across multiple nodes and/or ports. As an alternative to explicit "port addresses" (which, in the context of a large switching system would represent thousands of bytes of additional information carried by the packet), implicit "port addresses" may be determined by maintaining a predetermined order of the circuit switched data within the payload. For example, packets 3 and 5 are depicted as having sufficient payload capacities to carry a total of 2,048 bytes of circuit switched data. When such bytes are placed in the payload, they are preferably arranged in an order which corresponds exactly with the sequence of time slots at a given node. Specifically, the byte of circuit switched data which corresponds to the "first" time slot (time slot (TS) 0) of a given node is placed first in the payload, followed by the remaining bytes in sequential order. By this arrangement, any given node may either load circuit switched data into or extract data from the payload and, by simply counting the position of a particular byte relative to the first byte in the payload, know exactly the time slot with which the byte corresponds.

In contrast, packets 7 and 9 do not generally require "port addresses" since the information carried by those types of packets is not circuit switched data.

Additional information may be included in control portion 16 to specify the packet type, the length of the packet, a packet sequence number or other information.

The length or payload capacity of each packet type may be varied depending upon which node transmits a given packet. For example, the payload capacities of packets 3 and 5 may be different so long as they provide sufficient capacity to carry circuit switched data up to the maximum number of ports switched or processed by a given node. Thus, if a particular node is capable of switching or processing a maximum of 2,048 ports, then that node preferably transmits packets 3 and 5 with payloads having capacity for up to 2,048 bytes of circuit switched data. Similarly, if a different node is capable of switching only 512 ports, that node preferably transmits packets 3 and 5 with payloads having capacity for up to 512 bytes of circuit switched data.

The payload portions of all packet types are preferably followed by status and control information, which may include a checksum or other information for error detection and correction.

A packet switched data packet 7 and a maintenance packet 9 are similarly constructed (their lengths or payload capacities are variable), except that these types of packet do not carry circuit switched data but, as described below, are intended to transfer packet switched data which originates from a single point (source) and is destined to be transferred to another single point (destination) or to multiple single points ("broadcast"). The status and control portions of packets 7 and 9 may include information which indicates whether a destination node for a given packet was able to accept the packet or was busy at the time of receipt and unable to accept the packet.

Figure 2A:
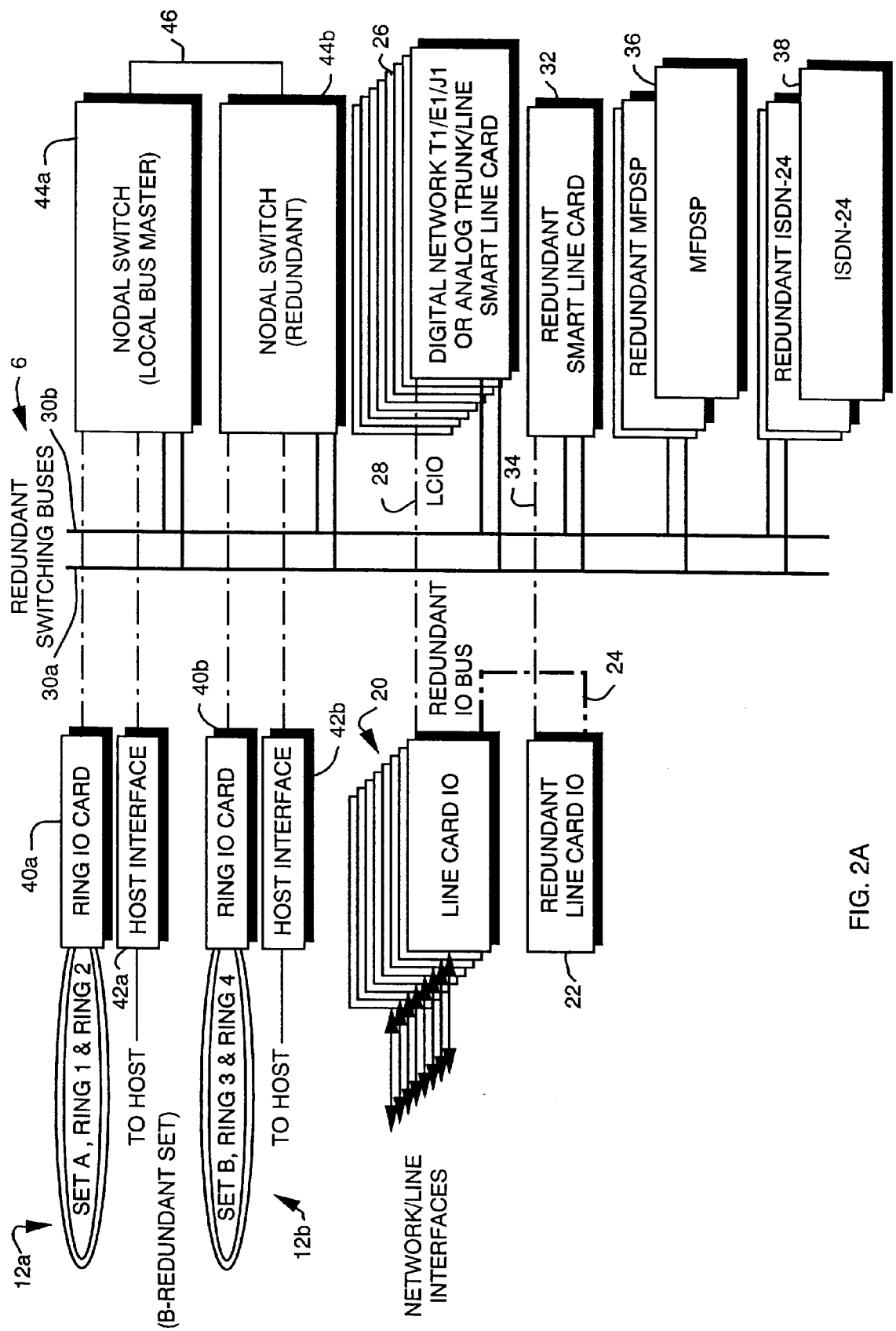
FIG. 2A is a block diagram of a one type of programmable switching node that may be used in the systems of FIGS. 1A through 1D.

FIG. 2A shows the major functional components of a preferred embodiment of one type of programmable switching node which may be used in the systems of FIGS. 1A through 1D. Digital or analog network/line interfaces are terminated on a series of line card input/output (IO) cards 20. In a preferred embodiment, network/line interfaces representing a total of 2,048 ports may be terminated by line card IO cards 20. If desired, a redundant line card IO card 22 and redundant IO bus 24 may optionally be provided to permit continued operation of the switching node in the event of a failure of one of line card IO cards 20.

A series of digital network T1, E1, J1 or analog trunk/line line cards 26 communicate with line card IO cards 20 over line card (LC) 10 lines 28. Line cards 26 are also interfaced with redundant switching buses 30a and 30b. Again, if desired, an optional redundant line card 32 may be provided, which communicates with redundant line card IO card 22 over redundant LC 10 lines 34. Other types of network/line interfaces such as DS3, SONET or others may also be provided.

Diverse communications services such as tone detection and generation, conferencing, voice recorded announcements, call progress analysis, speech recognition, ADPCM compression and many others are provided by one or more multifunction digital signal processing (MFDSP) cards 36. ISDN Primary Rate service and other packet communications services are provided by one or more ISDN-24 cards 38. Redundant MFDSP cards 36 and redundant ISDN-24 cards 38 may be optionally included. Details of the preferred construction and operation of MFDSP cards 36 and ISDN-24 cards 38, as well as buses 30a and 30b, are disclosed in a co-pending application, filed Jan. 5, 1993, Ser. No. 08/001,113, now issued as U.S. Pat. No. 5,349,579 and assigned to the assignee of the present application and hereby incorporated by reference. Assuming it is equipped with one or more cards 36 or 38, a particular node may operate independently from other nodes in terms of performing diverse communications services. Alternatively, as described below, only one node (or a subset of all of the nodes) may be equipped with cards 36 or 38, and inter-nodal network 12 may be used to provide communications services to other nodes which are not so equipped.

A ring (network) IO card 40a serves as an interface between one pair of rings (designated Set A, Rings 1 and 2), which together are designated inter-nodal network 12a, and a nodal switch 44a that is designated the "local bus master," the significance of which is described below. A first host interface 42a handles all communication between host 4 and the node of FIG. 2A.

A second, redundant ring (network) IO card 40b serves as an interface between a redundant pair of rings (designated Set B, Rings 3 and 4) which together form a second inter-nodal network 12b, and a redundant nodal switch 44b, which is preferably of the same construction as nodal switch 44a. A second host interface 42b provides a communication link with host 4. A link 46 provides for communication between nodal switches 44a and 44b. Link 46 is used only to connect a nodal switch which is operating as the local bus master with another nodal switch which is operating as a redundant local bus master.

In a preferred embodiment, line cards 26 perform real time call processing functions which are required by network/line interfaces, including analog to digital conversion, if necessary. Line cards 26 transmit and receive time division multiplex (TDM) circuit switched data over switching buses 30a and 30b. Each of nodal switches 44a and 44b, MFDSP cards 36 and ISDN-24 cards 38 receive, over the buses 30a and 30b, circuit switched data transmitted in all time slots from all line cards 26. Each of nodal switches 44a and 44b, MFDSP cards 36 and ISDN-24 cards 38 has the ability, under the direction of the local bus master (i.e., nodal switch 44a), to transmit circuit switched data to the line cards 26, over switching buses 30a and 30b, during predetermined time slots. In addition, switching buses 30a and 30b each include a high level data link control (HDLC) bus over which CPUs in nodal switches 44a and 44b, MFDSP cards 36 and ISDN-24 cards 38 exchange control messages.

For convenience, throughout the remainder of this description, the term "local port" shall be used to refer, with respect to a given node, to a time slot containing circuit switched data transmitted from a line card 26 to all nodal switches 44, MFDSP cards 36 and ISDN-24 cards 38 (if any), or a time slot containing data transmitted from any nodal switch 44, MFDSP card 36 or ISDN-24 card 38 to a line card 26. The term "remote port" shall be used to refer, with respect to a given node, to a local port of a different node.

In a preferred embodiment, each node 6a–6h is capable of time switching up to 2,048 local ports. Thus, in this preferred embodiment, each of nodal switches 44a and 44b includes a time switch capable of switching 2,048 time slots. In accordance with one aspect of the present invention, the switching memory of each nodal switch 44a and 44b need only be sufficiently large to accommodate the maximum number of local ports and not the switching capacity of the entire system. A significant advantage of this aspect of the present invention may be appreciated by momentarily referring again to FIGS. 1A and 1B. As mentioned above, a preferred embodiment of the system 2 is capable of switching a total of 16,384 ports. However, the switch (nodal switch 44a) within each of nodes 6a–6h need only contain a switching memory which is large enough to switch 2,048 local ports, not 16,384 ports of the entire system 2. As described more fully below, it is the novel arrangement of inter-nodal network 12 and its ability to transfer circuit switched data from one node to any other node which provides, in effect, a second stage of switching which yields the high overall capacity of system 2.

Figure 2B:
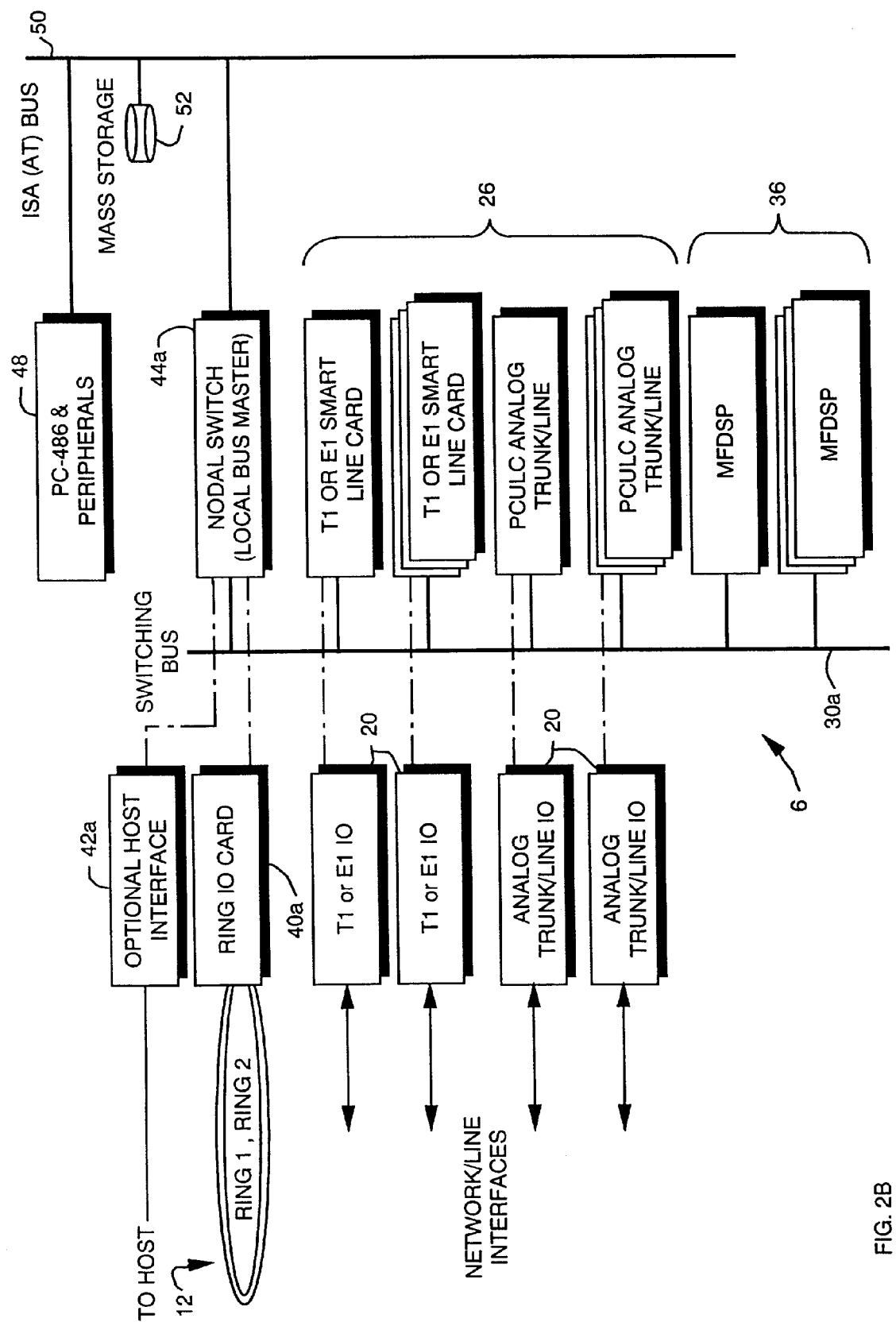
FIGS. 2B and 2C are a block diagram of a second type of programmable switching node that may be used in the systems of FIGS. 1A and 1B.
Figure 2C:
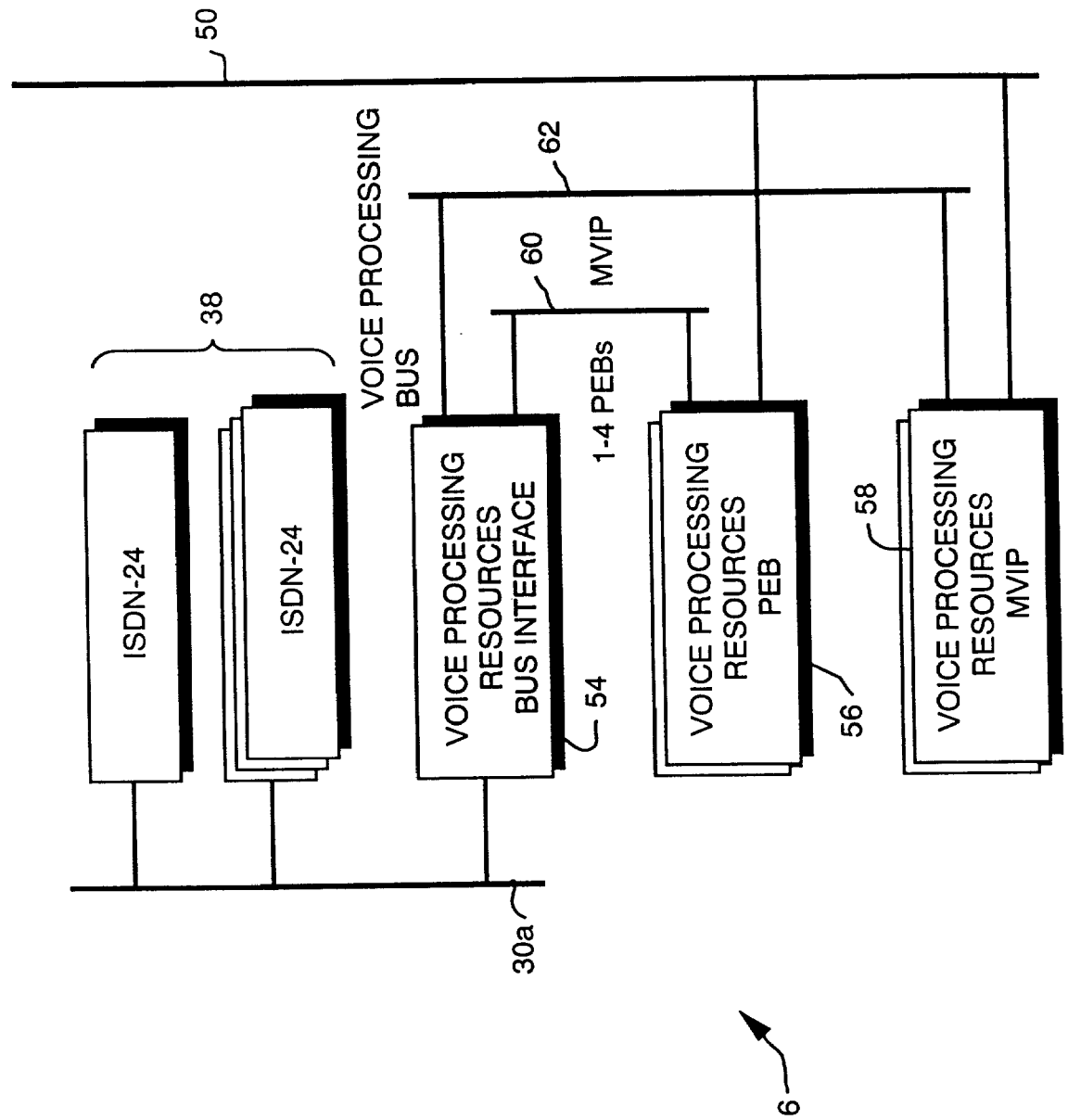

FIGS. 2B and 2C show a preferred embodiment of a second type of programmable switching node. This type of node is preferably based on an off-the-shelf PC which includes a PC-486 (or equivalent) and peripherals 48, an ISA (AT) bus 50 and a mass storage device 52. The PC-486 48 may be used to run a user's application software and effectively operate as a host 4. Alternatively, an optional host interface 42a may be used to connect an "external" host (such as host 4 in FIGS. 1A through 1D) to control the node. In addition to components already identified in connection with the preceding figure, several additional components are provided in this embodiment. A voice processing resources bus interface 54 provides bidirectional communication between switching bus 30a and two voice processing buses, PEB bus 60 and/or MVIP bus 62. PEB bus 60 and MVIP bus 62 represent well known, "standard" interfaces for communicating with commercially available, widely used voice processing resources 56 and 58, respectively. For example, Dialogic Corporation of New Jersey produces a family of voice processing resource boards or cards which plug directly into PEB bus 60 and may be used in diverse applications including voice mail, fax mail, interactive voice response and others.

The detailed construction of a preferred embodiment of nodal switch 44a is shown in FIGS. 3A through 3E. A central processing unit (CPU) with associated RAM/ROM 64 is connected in communicating relationship with a CPU address bus 114 and a CPU data bus 116. CPU 64 is also connected in communicating relationship with an HDLC bus (part of switching buses 30a and 30b) and may, depending upon the configuration of nodal switch 44a discussed below, also be connected in communicating relationship with host 4.

A data transmitter 66 is connected in communicating relationship with CPU address and data buses 114 and 116 and two packet handling circuits 78a and 78b. Transmitter 66 is also connected to receive circuit switched data for local ports over switching bus 30a (redundant switching bus 30b is omitted for clarity). As explained below, depending upon its mode of operation, transmitter 66 may receive and time switch circuit switched data which is flowing in a direction from a Line card to a Switch (LSDATA) or, alternatively, may receive and time switch data which is flowing in a direction from a Switch to a Line card (SLDATA). Transmitter 66 includes two ring maps 96, 98, corresponding to rings 1 and 2, respectively, a local sequential counter/map 100 and a quad-port local transmitter memory 102.

A data receiver 68 is connected in communicating relationship with CPU data and address buses 114 and 116, and with a space switch control circuit 112 whose output is transmitted over switching bus 30a. Receiver 68 may, in conjunction with space switch control circuit 112, depending upon its mode of operation, output circuit switched data which flows in either the SLDATA or LSDATA direction (e.g., whichever is opposite to that of the data input to transmitter 66). Receiver 68 includes a sequential count/map 104, a local time slot map 106, a tri-port local receiver memory 108, a pad lookup memory 110, a dual-port local data packet receiver memory 118 and a sequential map/control 120.

A high speed data receiver 70a is physically interfaced with ring 1 for receiving information in packet form from that ring. Receiver 70a is preferably implemented with a Hewlett-Packard Company HDMP-1014 receiver chip, which is an emitter coupled logic (ECL) device. Conversion circuit 72a is connected to receive the output signals of receiver 70a and produce output signals that are compatible with transistor-transistor logic (TTL). The output of conversion circuit 72a is applied to a multiplexer 74a, which converts 16 bit data received from receiver 70a to 32 bit format. The output of multiplexer 74a is applied to a first-in-first-out (FIFO) memory 76a, a packet control circuit 92a and a ring select circuit 94. A transmit flag (XF) circuit 90a is connected to packet control circuit 92a. The output of FIFO 76a is connected to packet handling circuit 78a. A demultiplexer circuit 80a, conversion circuit 82a and high speed data transmitter 84a perform functions which are the complements of multiplexer 74a, conversion circuit 72a and data receiver 70a, respectively. Transmitter 84a is preferably implemented with a Hewlett-Packard Company HDMP-1012 transmitter chip.

Separate, but identical, circuitry is provided for interfacing with and transferring information to or from ring 2. Like reference numbers are used to identify corresponding components. As explained below in connection with FIGS. 6A and 6B, during periods of time when nodal switch 44a operates in a "loopback" mode, the output of transmitter 84b is effectively connected to the input of receiver 70a, as indicated in phantom and reference number 71a. Similarly, the input of receiver 70b is effectively connected to the output of transmitter 84a, as indicated by reference number 71b.

Nodal switch 44a includes additional components for timing and synchronization functions, which are grouped together as master node options 65 and local bus master options 71. Master node options 65 include an inter-nodal synchronization circuit 67 and a master ring oscillator 69. Synchronization circuit 67 generates reference signals ref 1 . . . ref n, each of which is supplied to one other switching node (see FIGS. 1A through 1D). Synchronization circuit 67 also generates a nodal frame synchronization signal and a master ring clock signal, both of which are supplied to the packet control circuits 92a and 92b.

Local bus master options 71 include a local bus HDLC control 73 and a local synchronization circuit 75. Local bus HDLC control 73 is connected in communicating relationship with CPU address and data buses 114 and 116, respectively, and generates a series of control signals 1 . . . n which are supplied to all other cards (i.e., other nodal switches, line cards, MFDSP cards and ISDN-24 cards) associated with a given node for controlling access to the HDLC bus.

Local synchronization circuit 75 receives two input signals. One input signal is either one of the ref 1 . . . ref n signals (if another nodal switch is configured as the master node) or a loop timing source (if the nodal switch of FIGS. 3A through 3D is itself configured as the master node). The frame synchronization signal to circuit 75 is obtained from either inter-nodal network (ring) 12 or one of ref 1 . . . ref n signals (if another nodal switch is configured as the master node). Circuit 75 will self-generate the frame synchronization signal if it is itself configured as the master node.

Figure 3A:
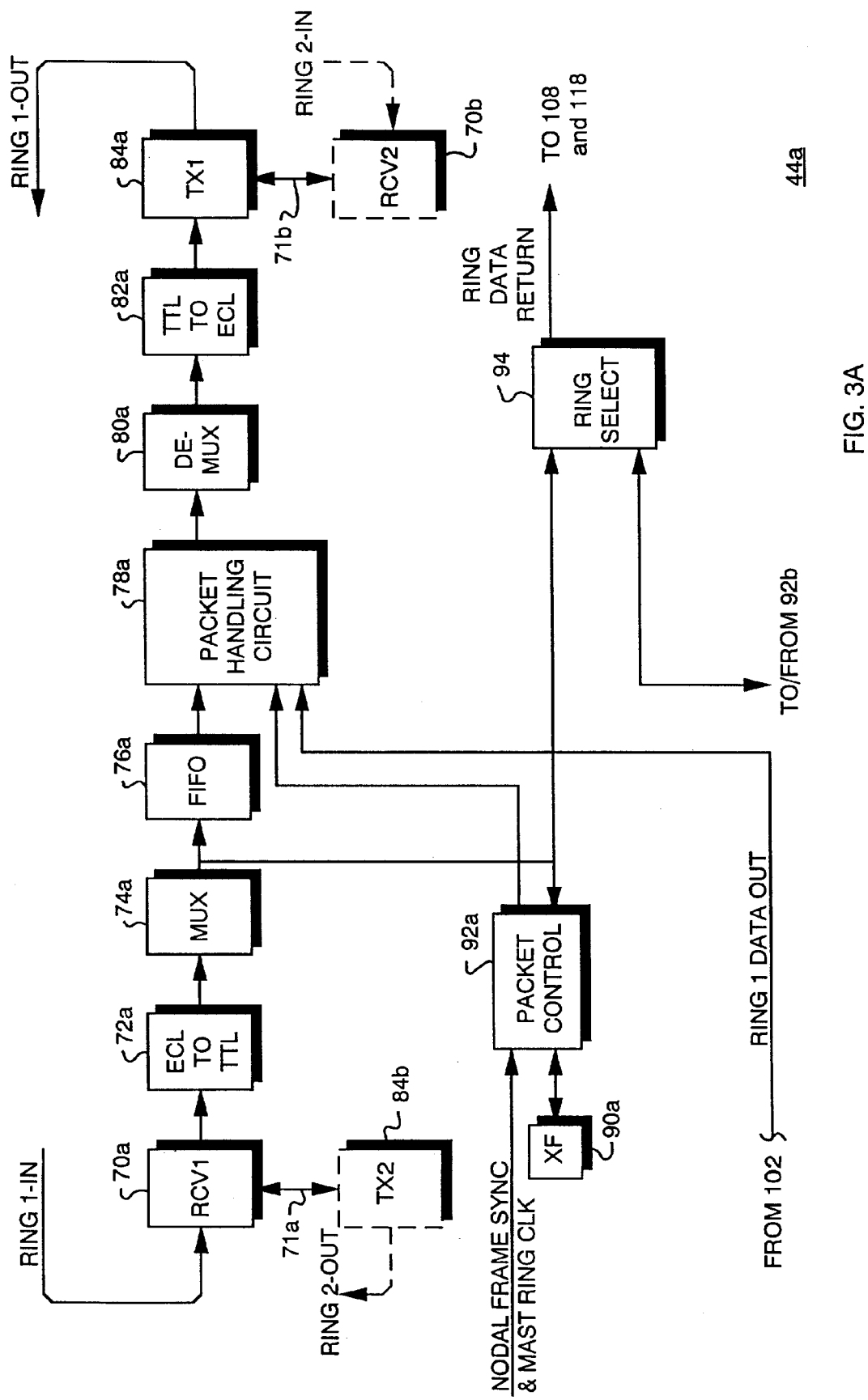
FIGS. 3A through 3E are a block diagram of the nodal switch shown in FIGS. 2A through 2C.
Figure 3B:
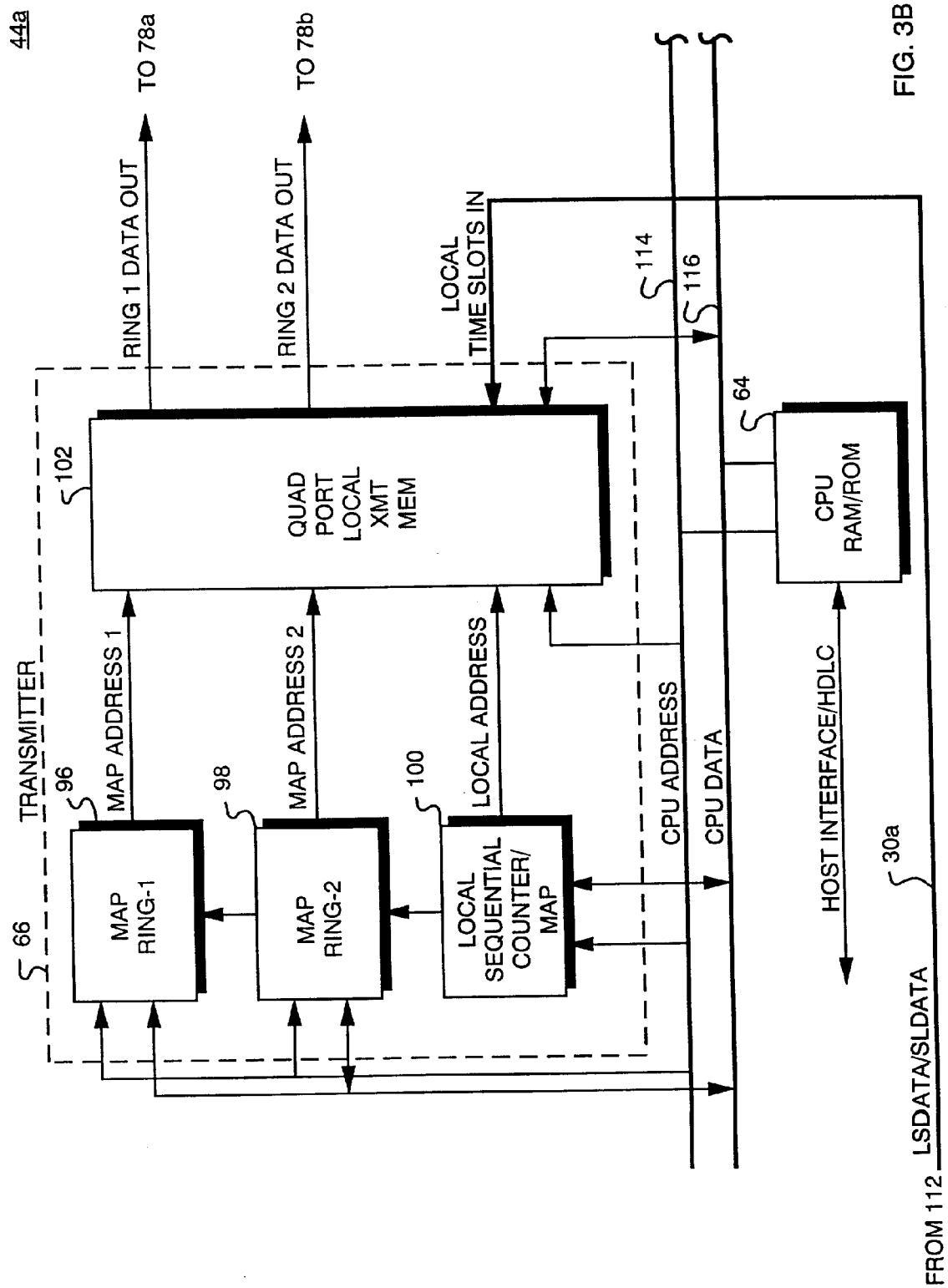
Figure 3C:
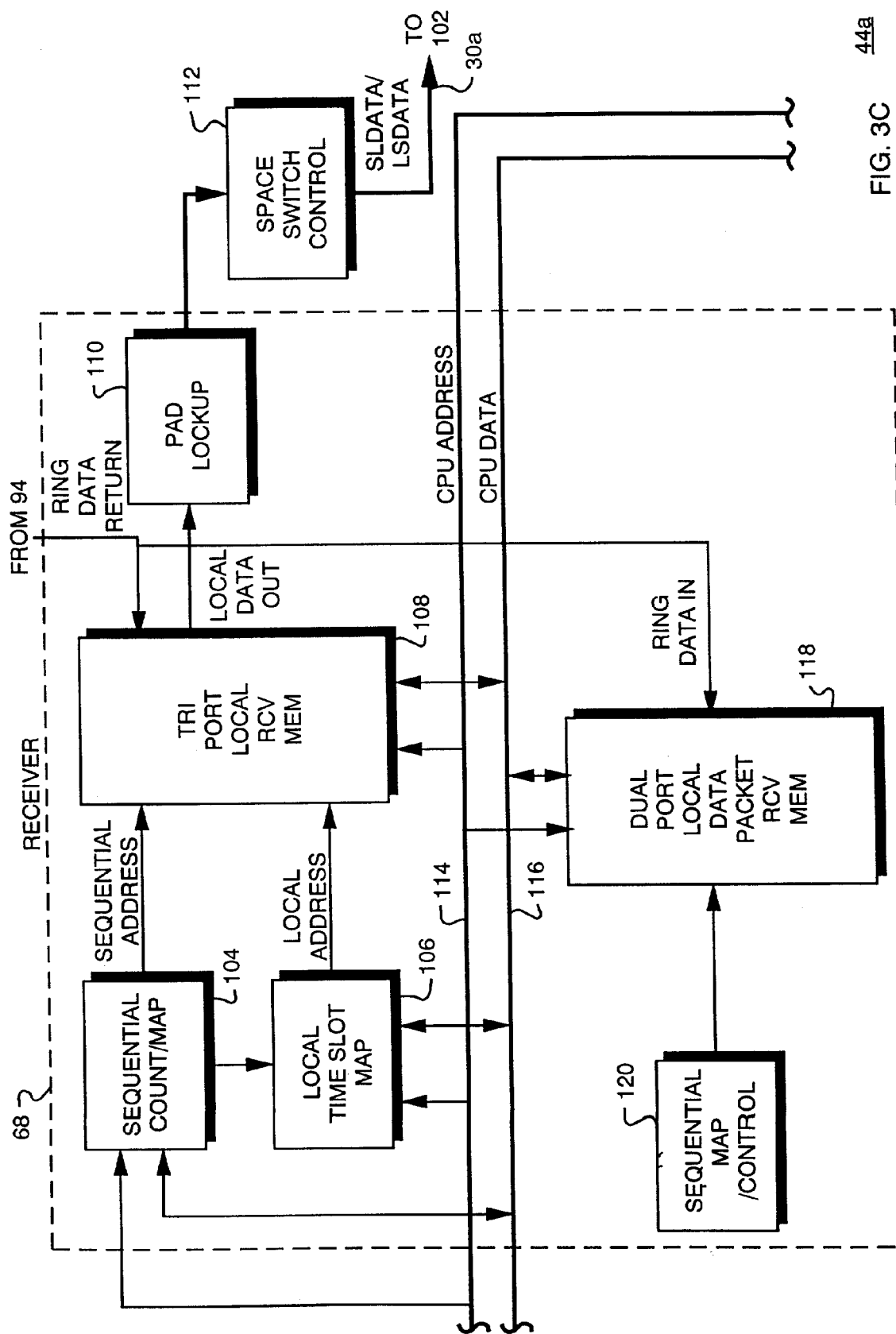
Figure 3D:
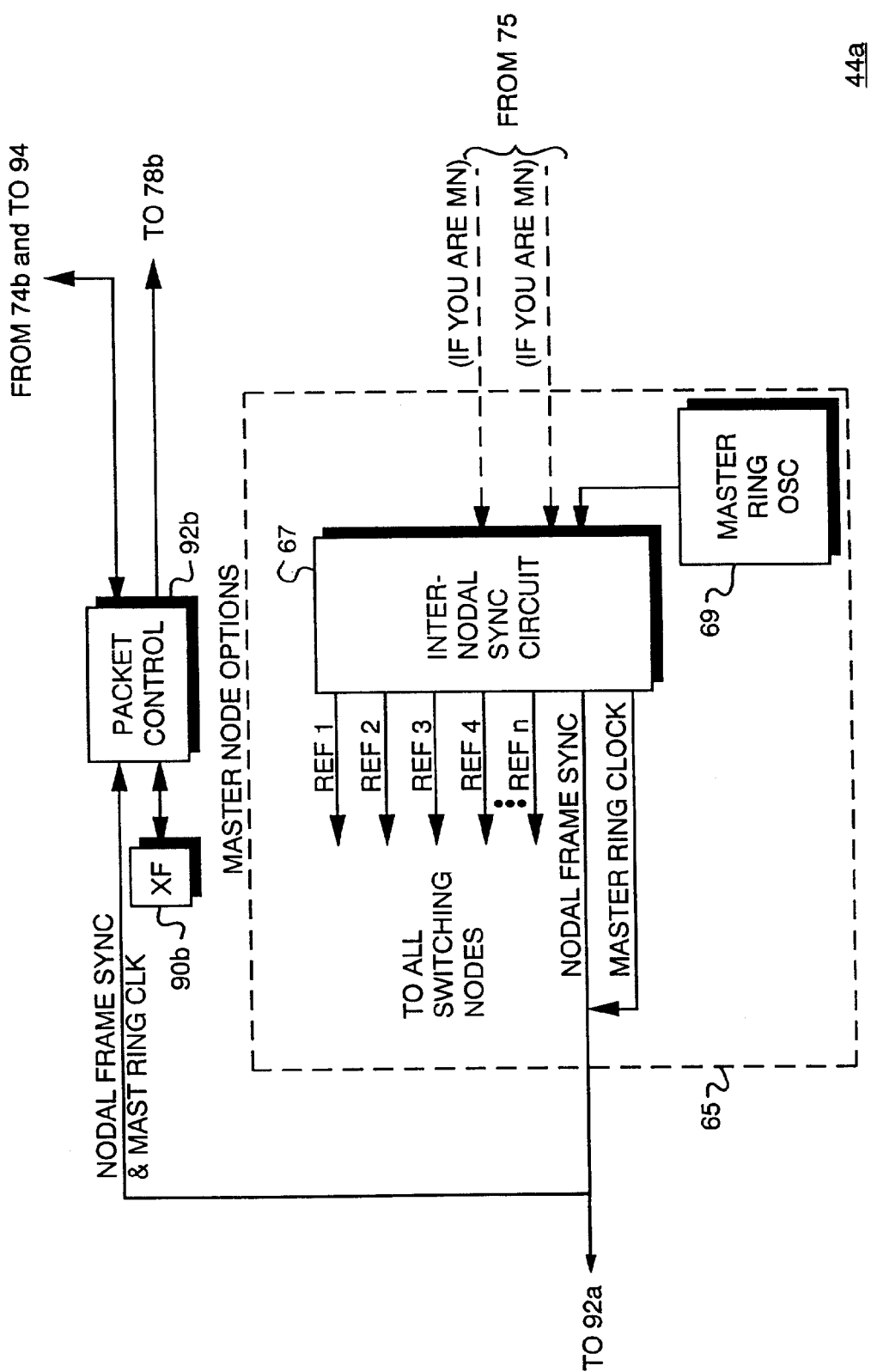
Figure 3E:
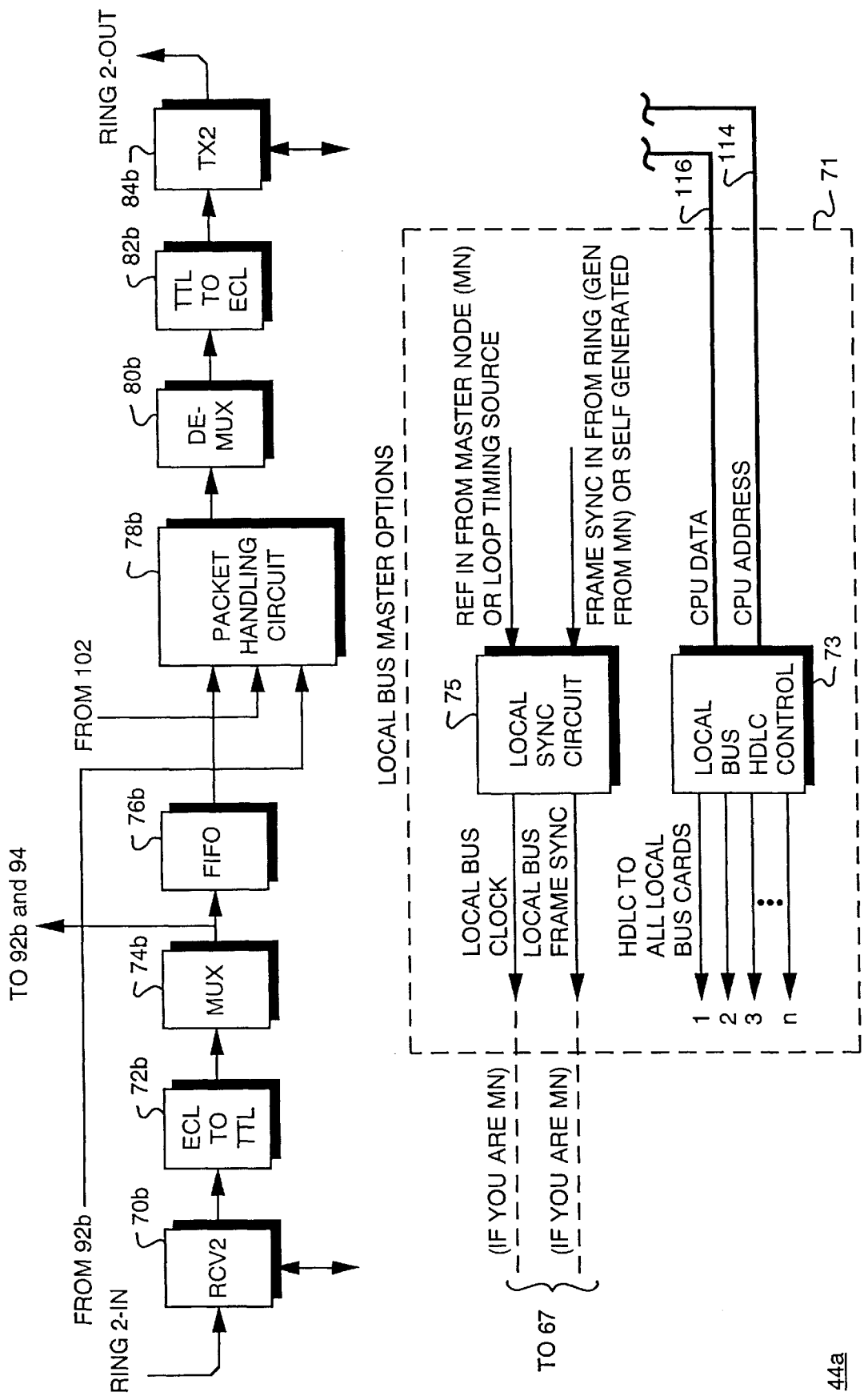
Figure 3F:
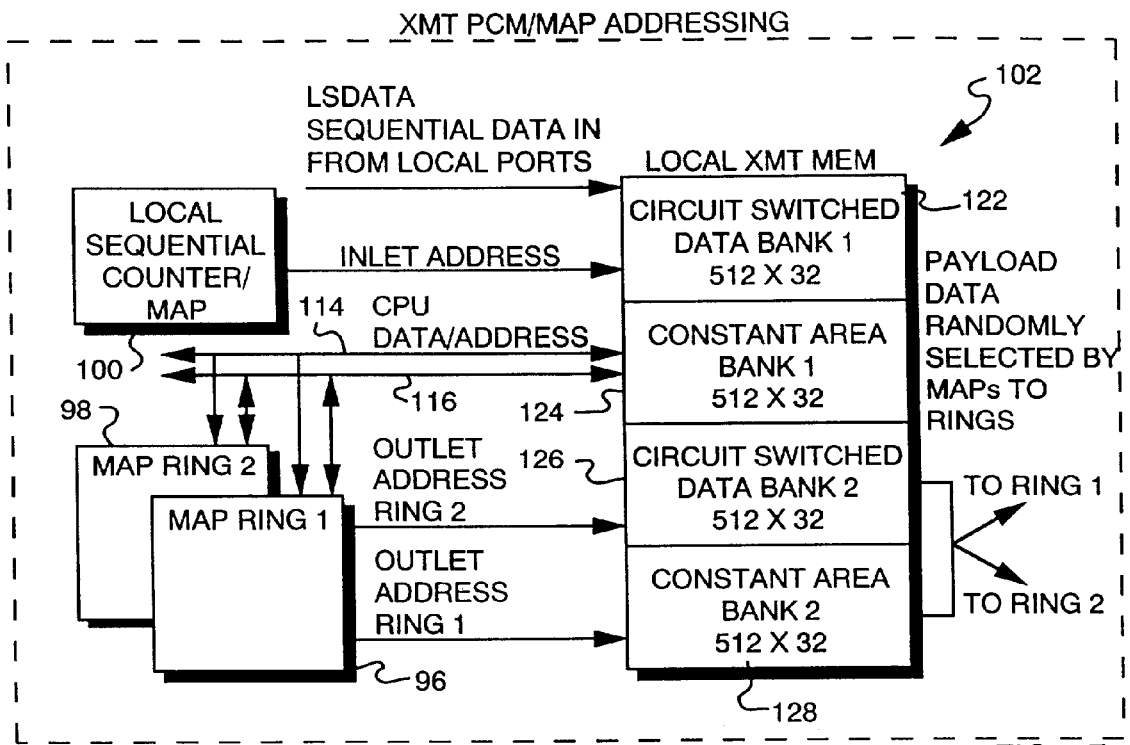
FIGS. 3F and 3G are a detailed diagram of the transmitter and receiver memories shown in FIGS. 3B and 3C.
Figure 3G:
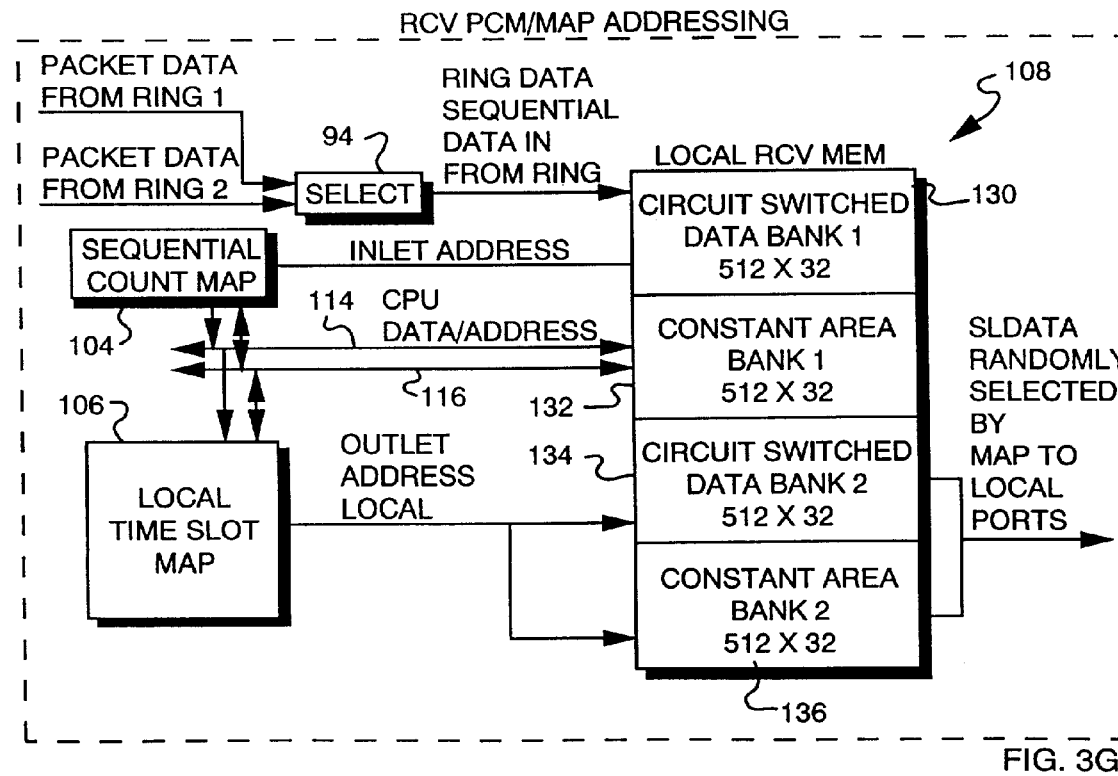

Further details regarding the construction of receiver memory 108 and transmitter memory 102 are shown in FIGS. 3F and 3G. Transmitter memory 102 is organized into dual circuit switched data banks 122 and 126, and dual constant areas 124 and 128. Similarly, receiver memory 108 is organized into dual circuit switched data banks 130 and 134, and dual constant areas 132 and 136. The dual circuit switched data banks of each memory are operable, in conjunction with their respective maps and counters, to time switch circuit switched data. That is, during a given time slot, a byte of circuit is switched data is written sequentially into a memory location in one of the circuit switched data banks, while circuit switched data stored in the other circuit switched data bank is read "selectively." The term "selectively" is used in this description to refer a process of applying addresses which are supplied by a map. During alternate 125 μs time periods, the roles of the circuit switched data banks reverse, thus interchanging the time slots to effect time switching.

The constant areas of each memory are generally available for storage of packet switched data by CPU 64, although the CPU 64 may access any location in either memory.

Configuration Synchronization and Initialization

Before proceeding with an overview of the operation of nodal switch 44a, it is helpful to understand how each switch may be configured to operate and what its responsibilities are in terms of system synchronization and initialization. With reference again to FIGS. 1A, 1B and 3A through 3E, it should be understood that each programmable switching node 6a–6h must contain at least one, but may contain more than one, nodal switch 44a. It should also be understood that, in general, two types of synchronization must be considered: inter-nodal network synchronization and PSTN (or private network) synchronization.

Each nodal switch 44a is preferably configurable, by software, to operate as (1) a combination master node and local bus master, (2) a local bus master only, or (3) neither a master node nor a local bus master, but simply a "standard" switch. The configuration rules are as follows. For each inter-nodal network 12, there must at any given time be one and only one nodal switch which is operating as the master node. Whichever nodal switch is operating as the master node may also operate as the local bus master for its node. Within a given node, there must at any given time be one and only one nodal switch which is operating as the local bus master for that node. Lastly, within a given node, at any given time there may be one or more nodal switches operating as standard switches.

The responsibilities of a nodal switch operating as the master node are: (1) interface to PSTN for loop timing source (via circuit 75) for bit synchronization to digital networks of the PSTN; (2) generate system wide maintenance packets which all other nodes use for frame synchronization to digital networks of PSTN (based upon the nodal frame synchronization signal generated by circuit 67); (3) generate a switching reference clocking source (ref 1 . . . ref n) for bit synchronization of all non-master nodes; (4) optionally transmit a master framing signal over ref 1 . . . ref n; (5) generate a master clock for the inter-nodal network (master ring clock); (6) break the network (ring) clocking; and (7) keep the integrity of the inter-nodal network intact.

The responsibilities of a nodal switch operating as a local bus master are: (1) interface to PSTN loop timing source or ref 1 . . . ref n from master node for bit synchronization to digital networks of the PSTN; (2) accept system wide maintenance packets generated by the master node for frame synchronization to digital networks of the PSTN; (3) communicate with the host; (4) communicate with all other cards in the node (other nodal switches, line cards, MFDSP cards and ISDN-24 cards) over the HDLC bus (controlled by control signals 1 . . . n from HDLC control 73); and (5) generate nodal clock and framing for all other cards in the node (local bus clock and local bus frame synchronization signals from circuit 75).

The responsibilities of a nodal switch operating as a standard switch are: accept local bus clock and local bus frame synchronization signals from local bus master.

The master node is responsible for initializing and configuring the system, which involves verifying the integrity and operability of the inter-nodal network 12 and, optionally, either assigning a nodal address to each node or polling the nodes to determine their previously assigned addresses. Once a node's address is assigned or determined, the master node may interrogate that node (i.e., using maintenance packets over inter-nodal network 12) to obtain configuration information such as nodal type, types of PSTN interfaces and/or protocols, switching capacity or other information. The master node may also have responsibilities for performing maintenance and administration functions. In addition, if multiple rings are used to implement any inter-nodal network, the master node may assign each nodal switch a particular ring for transmitting and receiving packets.

Overview of Operation

With reference to FIGS. 1C, 1D and 3A through 3G, an overview of the operation of the system 17 will now be presented. Consideration will be given first to how circuit switched data is handled. For purposes of this overview, it is assumed that system 17 is already initialized.

The LSDATA (or SLDATA) which is input to transmitter memory 102 represents bytes of circuit switched data for local ports served by a given node. These bytes are written sequentially into the circuit switched data banks 122 and 126. Accordingly, the capacities of those data banks effectively determine the maximum number time slots to which can be time switched by nodal switch 44a. For purposes of this overview, it is assumed that each data bank has a capacity of 2,048 bytes, meaning that a maximum of 2,048 local ports can be time switched by transmitter memory 102.

In order to make this "local" circuit switched data (stored in memory 102) available to every other node served by inter-nodal network 12, one of two methods may be used. In the first method, transmitter 66 and packet handling circuit 78a (it is assumed that ring 1 is the ring assigned to this node for transmission of packets) formulate a packet whose payload is "empty" (meaning that the payload contains no circuit switched data, except for data from local ports which are connected to other local ports), but which has sufficient capacity to hold up to 2,048 bytes of circuit switched data. Transmitter 84a then transmits the "empty" packet. If we assume, for example, that the "empty" packet is transmitted by node 6c, then node 6d will be the first node to receive that packet (i.e., the first adjacent node in the direction of flow around the ring is the first to receive the "empty" packet).

At either node 6b or 6d, the "empty" packet is received by receiver 70a and eventually passed to packet handling circuit 78a. Packet handling circuit 78a receives circuit switched data which is read selectively from circuit switched data banks 122 and 126 in response to addresses supplied by map (ring 1) 96. In other words, by virtue of the addresses and control it supplies, ring map 96 causes particular bytes (or possibly all of the bytes or none of the bytes) of "local" circuit switched data stored in banks 122 and 126 to be selectively read from those banks and passed to the packet handling circuit 78a. A similar process occurs in parallel with map (ring 2) 98, memory 102 and packet handling circuit 78b.

Packet handling circuit 78a inserts the "local" circuit switched data it receives (if any) into the payload of the received "empty" packet while that packet is passing to the transmitter 84a for transmission to the next node on the inter-nodal network 12. This process is repeated such that each other node, in succession, has the opportunity to insert its own "local" circuit switched data in the payload of the packet which originated from node 6c. If a particular node has no "local" circuit switched data to insert in the payload, the received packet passes unaltered to the next node. Eventually, the packet which was sent out "empty" traverses the entire ring on which it was transmitted and returns "full" to the node from which it was transmitted (originated). At that node (6c), circuit switched data from the payload of the "full" packet is passed through ring select circuit 94, written sequentially into receiver memory 108 and then time switched out as LSDATA or SLDATA. This method is referred to as the "Empty Send/Full Return" or ESFR method for shorthand.

The ESFR method is repeated such that each node, in turn, transmits an "empty" packet and receives a "full" return packet (on the node's assigned ring), thereby enabling "local" circuit switched data originating from any port at any node to be effectively transferred to any other port of the same or different node. All circuit switched data is preferably transferred in less than 125 $\mu$s to avoid loss of samples. As explained below, it should also be understood that the ESFR method may be used to "broadcast" or transfer information originating from one port to more than one other ports.

In the second method, the concept is for each node, in turn, to originate (transmit) a packet whose payload is "full"

when sent, but "empty" upon return. Thus, a shorthand name for this method is the "Full Send/Empty Return" or FSER method. In the FSER method, all of the "local" circuit switched data stored in circuit switched data banks 122 and 126 of transmitter memory 102 is read sequentially and supplied to packet handling circuit 78*a*. A "full" packet is constructed whose payload includes all of the "local" circuit switched data for a given node. The "full" packet is transmitted by transmitter 84*a* and is received by the first adjacent node. The data in the payload is selectively extracted and passed, via ring select circuit 94, to receiver 68. That data is then selectively written into data banks 130 and 134 of receiver memory 108. This process is repeated until a "full" packet transmitted by each node has been received by every other node, thus achieving the same overall result of enabling "local" circuit switched data originating from any port at any node to be effectively transferred to any other port of the same or different node.

In addition to transferring circuit switched data between nodes, inter-nodal network 12 may also be used to transfer packet switched data. Examples of packet switched data are data or maintenance information needed to control the switching system itself, X0.25 packets, LAPB or LAPD packets. Packet switched data appears at the output of ring select circuit 94, but is written into packet receiver memory 118, as opposed to memory 108. Once stored in memory 118, packet switched data is accessible by CPU 64 via CPU data bus 116.

The ESFR Method

Figure 4A:
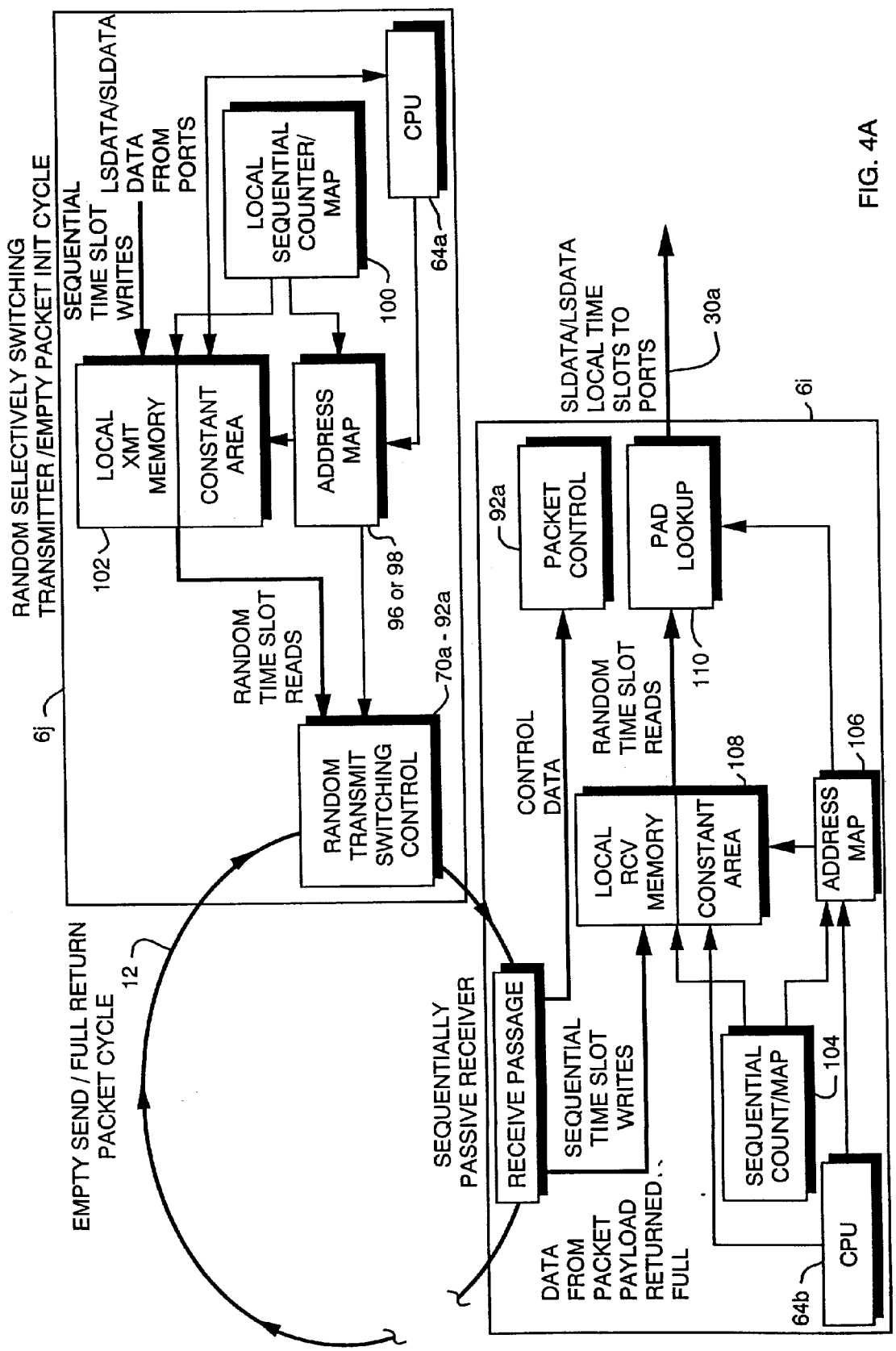
FIG. 4A is a block diagram which shows the receiving and transmitting functions involved in one method of transferring information over the inter-nodal networks of FIGS. 1A through 1D.
Figure 4B:
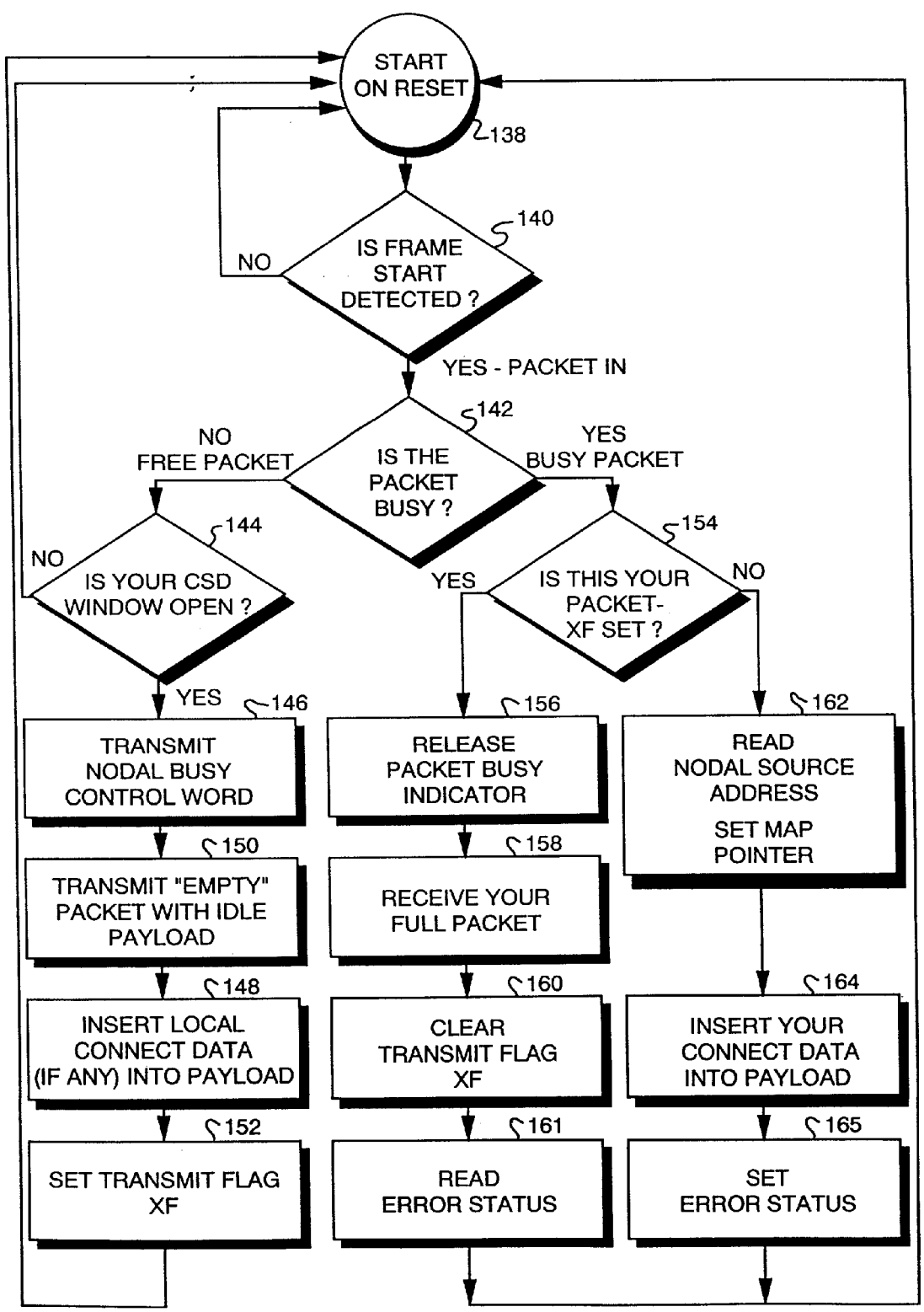
FIG. 4B is a flowchart showing the detailed steps of transferring circuit switched information in accordance with the method depicted in FIG. 4A.

Referring now to FIGS. 3A through 3E, 4A and 4B, further details of the ESFR method will be described. It should be understood that the flowchart of FIG. 4B represents the steps which are performed, in parallel, at each node by that node's packet control circuits (92*a* and 92*b*), the packet handling circuits 78*a* and 78*b* and related circuitry. It should be kept in mind that when the ESFR method is used, "empty" packets are transmitted on only one ring and received on only one ring (assigned during initialization). For this example, it is assumed that node 6*i* in FIG. 4A is preparing to transmit an "empty" packet over the inter-nodal network 12 for the purpose of collecting circuit switched data from other nodes, including node 6*j*.

The process begins at start on reset step 138, which is a state in which the node is essentially waiting for a frame (which contains a packet) to arrive on the inter-nodal network work 12. At step 140, a determination is made whether the start of a frame has been detected. If a start of frame is not detected, the process returns to start 138. Alternatively, if the start of a frame is detected, meaning that a packet was received by node 6*i*, then the contents of the control portion of the packet are checked to determine if the packet is "busy" at step 142. A packet's "busy" or not busy ("free") status is indicated by the busy indicator (BI) in the control portion of the packet (FIG. 1E). If the packet is not busy, meaning it is "free" for node 6*i* to use, the process proceeds to step 144 where a determination is made whether the circuit switched data (CSD) window for node 6*i* is open. The "CSD window" refers to a designated period of time which is allocated for all of the to nodes to transmit "empty" circuit switched data packets.

If the CSD window is not open, meaning that it is not the appropriate time for node 6*i* to transmit an "empty" packet for circuit switched data, then the process returns to start 138. If the CSD window is open, then the process advances to step 146 at which node 6*i* starts the process of sending a packet by transmitting a "busy" control word over the network 12 to take control of the packet. Next, at step 150, node 6*i* continues the process of sending an "empty" packet over the network 12. Note, however, that at step 148, node 6*i* must insert "local connect data" (if any) into the payload of the "empty" packet while transmission continues. The term "local connect data" refers to circuit switched data which is both originating from and destined for one or more local ports of a given node which is sending an "empty" packet. In other words, local connect data is circuit switched data which is to be switched from one local port to another local port of the same node over inter-nodal network 12. Thus, in this example, if node 6*i* has any local ports which are connected to each other, the circuit switched data pertaining to those ports would be inserted into the payload of the "empty" packet at step 148. In effect, node 6*i* (or any other node) transmits local connect data to itself. Next, at step 152, the transmit flag (XF) 90*a* (FIG. 3A) is set to serve as a reminder to node 6*i* that it has transmitted an "empty" packet over the network 12 and that it should receive the return "full" packet in the future.

Next, the process returns to start 138 to await receipt of another frame. Once the start of another frame is detected and it is determined that the packet within the frame is "busy" (not free), the process advances to step 154 where a determination is made as to whether the transmit flag is set. If XF is not set, meaning that the packet which was just received originated from another node, then the process proceeds to step 162 where address information contained in the control portion of the packet is checked to determine the (nodal) source of the packet. Thus, in this example, when node 6*j* actually receives the "empty" packet transmitted by node 6*i*, the process would advance to step 162 because node 6*j*'s transmit flag would not be set. At this point, node 6*j* must insert appropriate circuit switched data into the payload of the packet. In this example, the appropriate circuit switched data is data pertaining to any of node 6*j*'s local ports which already are (or are about to be) connected to any of node 6*i*'s local ports. As shown in FIG. 4A, this is accomplished by CPU 64*a* in node 6*j* writing address and control data into one of the address maps 96, 98 such that the appropriate circuit switched data is written selectively into the payload of the received packet at step 164. This step represents the beginning of a second stage of switching (node to node) performed by the system 17. Error status information is then placed in the status and control portion of the packet at step 165.

Next, under normal circumstances, the now "full" return packet is received by node 6*i*. If so, the process advances through steps 138, 140 and 142, to step 154 where again a determination is made (this time by node 6*i*) as to the status of the transmit flag. Since node 6*i* previously set its transmit flag (at step 152 when the "empty" packet was transmitted), that node determines that the flag is indeed set. At step 156, the busy indicator in the control portion of the packet is changed so that the packet, when passed to the next node, is "free" and may be used by another node. The circuit switched data contained in the payload, which consists of any local connect data that was inserted at step 148 along with all circuit switched data inserted by each other node (including node 6*j*), is then written sequentially into the receiver memory 108. Finally, the transmit flag is cleared at step 160 and error status information is checked at step 161 before the process returns to start 138. When circuit switched data is eventually time switched out of memory 108, it is processed by pad lookup circuit 110 which operates in a conventional manner to perform A-law to $\mu$-law (or vice versa) conversions.

Figure 4C:
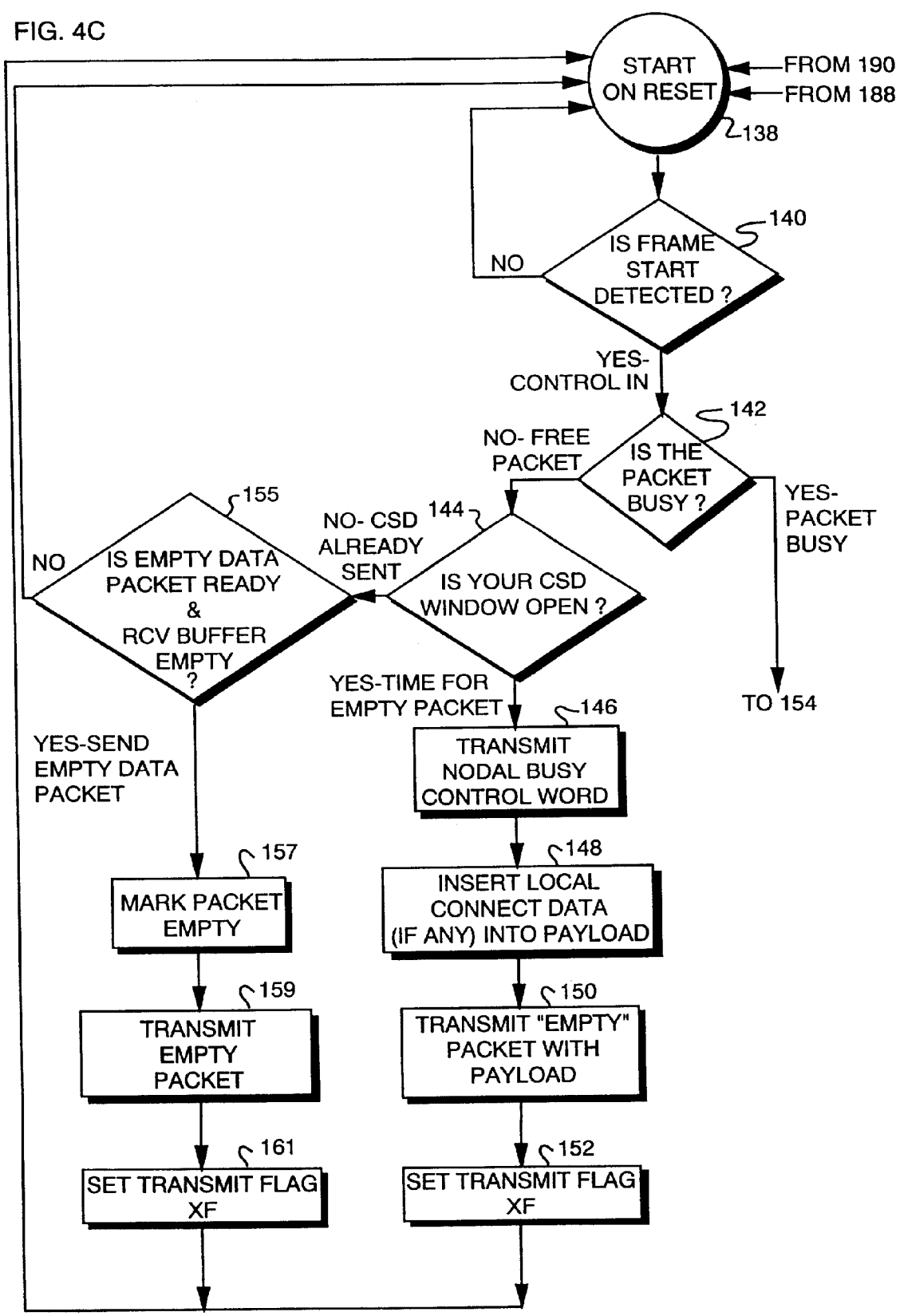
FIGS. 4C and 4D are a flowchart showing the detailed steps of transferring both circuit switched data and packet switched data in accordance with the method depicted in FIG. 4A.
Figure 4D:
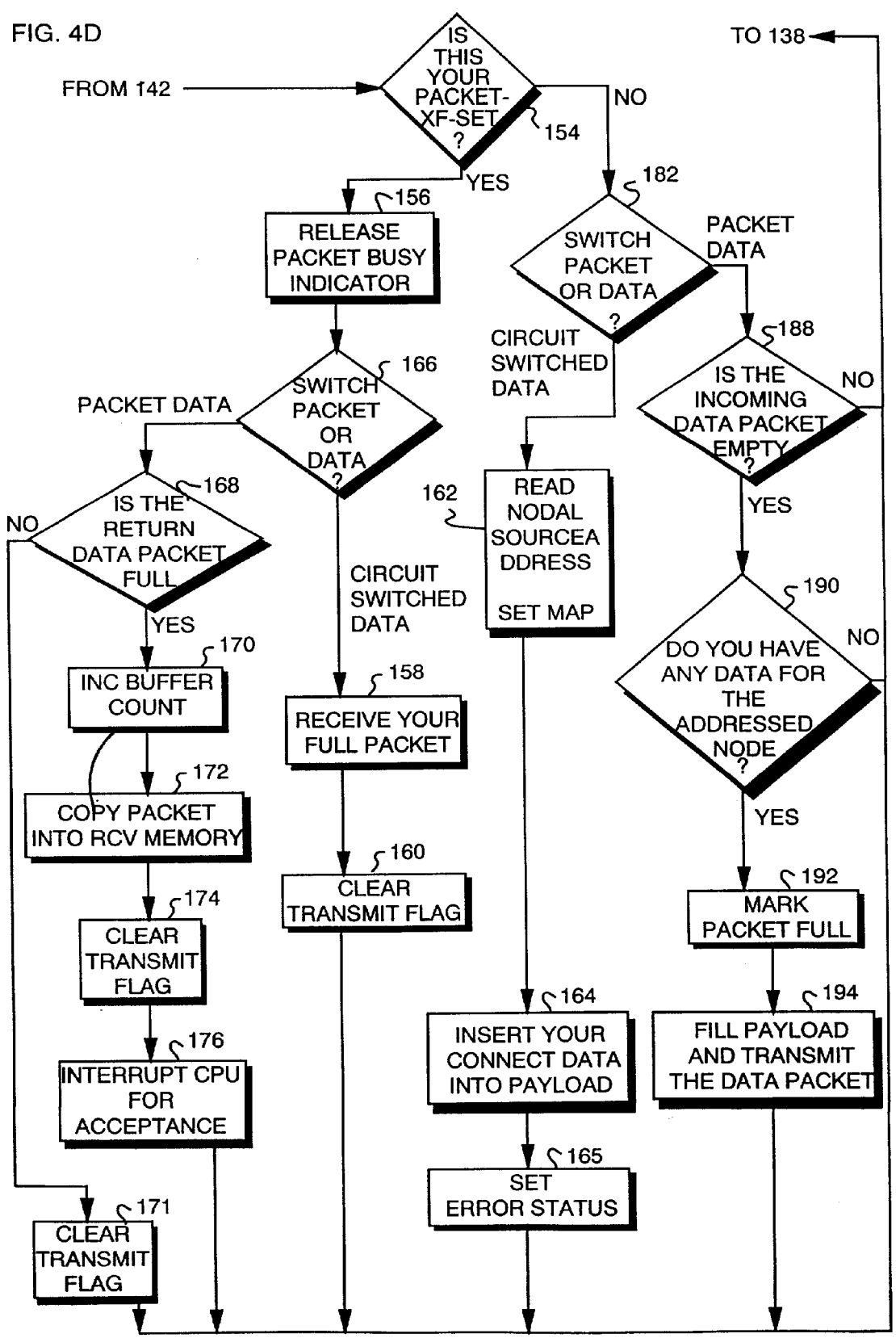

FIGS. 4C and 4D show an embodiment of the ESFR method in which both circuit switched data and packet switched data may be transferred between nodes. The initial steps are the same as those shown in FIG. 4B. However, note at step 144 that when a particular node determines that the CSD window is not open, meaning that its circuit switched data was already transmitted (in the current 125 µs frame), the process advances to step 155 instead of returning immediately to start 138. At step 155, a determination is made whether an "empty" data packet, which will be used to collect packet switching information from other nodes, is ready for transmission and the receiver memory is ready. If the "empty" data packet is not ready or the receiver memory is full (not ready), the process returns to start 138. Otherwise, the process advances to step 157 at which information in the control portion of that packet is changed to designate the packet as "empty". The "empty" packet is then transmitted at step 159, the transmit flag is set at step 161, and the process returns to start 138.

When the next frame is received, the process advances through steps 138, 140 and 142. Assuming that the received packet (within the frame) is designated "busy," the process advances to step 154 where the status of the transmit flag is checked. If the transmit flag is set, meaning that the node receiving this packet previously transmitted either an "empty" packet to collect packet switched data (at steps 159, 161) or an "empty" packet to collect circuit switched data (at steps 148–152), then the process advances to step 166 where a determination is made of what type of packet has just been received, again by examining information in the control portion of the packet. The type of packet is indicative of whether the packet's payload contains circuit switched data, packet switched data or possibly other types of data (e.g., voice processing or maintenance). If the packet is the type that carries circuit switched data, the process advances through steps 158 and 160, just as described in connection with FIG. 4B. If the packet is the type that carries packet switched data, the process advances to step 168 where a determination is made whether the packet is full. If the packet is not full, it means that no other node had any packet switched data to send (at least during the period of time it took for the packet to traverse the network) to the node which originally transmitted (and has just received) that packet. In that event, the transmit flag is cleared at step 171 and the process returns to start 138.

On the other hand, if it is determined that the packet is full at step 168, then the process advances to step 170 where a buffer counter is incremented. Next, the packet is copied into the data packet receiver memory 118 (FIG. 3C) where it is temporarily stored awaiting further processing. The transmit flag is then cleared at step 174. Lastly, the CPU 64b is notified of the arrival of a packet switched data packet by an interrupt at step 176.

With reference again to step 154, if a determination is made that the transmit flag is not set, meaning that the packet which was just received originated from another node, then the process advances to step 182 where, like step 166, a determination is made regarding the packet type. If the packet is of the type that carries circuit switched data, the process proceeds through steps 162, 164, and 165 just as in FIG. 4B. If the packet is the type that carries packet switched data, then the process advances to step 188 where a determination is made whether the packet is "empty." If the packet is not "empty," meaning that another node already filled the payload, the packet passes to the next node and the process returns to start 138.

Alternatively, if the packet is "empty," meaning it was originally transmitted "empty" by another node for the purpose of collecting packet switched data and no other node has already "filled" the payload, then the process advances to step 190 where the node which has received the packet determines whether it has any packet switched data to send to the node which originally transmitted the packet. If not, the "empty" packet is passed to the next node and the process returns to start 138. If so, the packet is marked "full" at step 192, the packet switched data is placed in the payload and the "full" packet is transmitted to the next node at step 194.

Figure 4E:
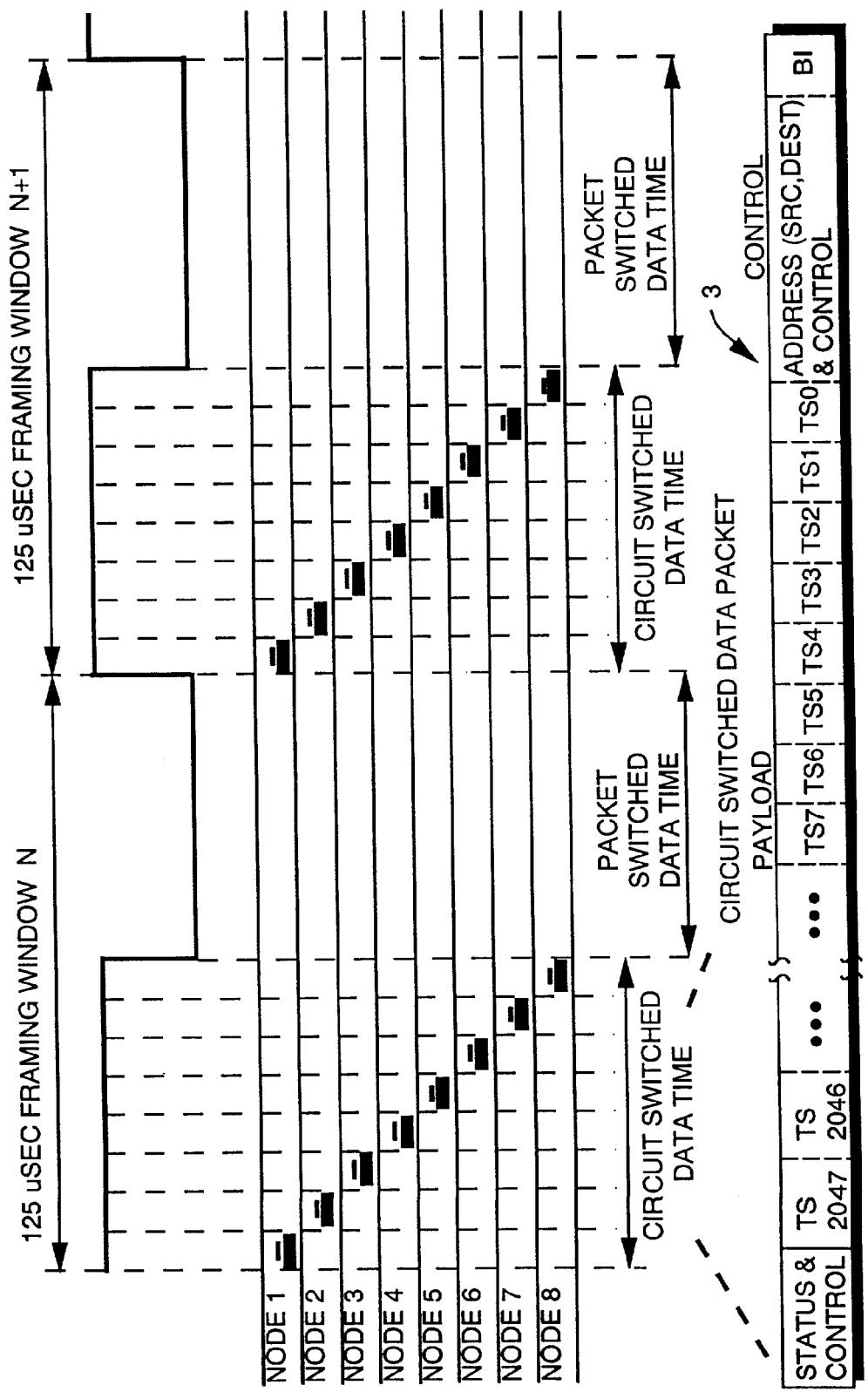
FIG. 4E is a timing diagram showing the time relationships between nodes for transferring both circuit switched data and packet switched data.

FIG. 4E is a timing diagram showing a preferred embodiment for allocating the bandwidth of the inter-nodal network 12 to allow transfers of both circuit switched data and packet switched data by all nodes. In this embodiment, transfers of data over the inter-nodal network are made within framing windows, each of which is 125 µs in duration. A period of 125 µs is preferred since it corresponds with the sampling rate (8 kHz) of most widely used network protocols, meaning that the values of circuit switched data may change every 125 µs. Therefore, by requiring that all inter-nodal transfers of circuit switched data take place in less than 125 µs, inter-nodal network 12 ensures that all such data is transferred before any values change. This also permits the inter-nodal network 12 to operate asynchronously with respect to the PSTN (or private network) 10.

Within each framing window, approximately one-half of the available time (i.e., 62.5 µs) is allocated for all nodes, in round-robin fashion, to transfer circuit switched data to other nodes. Such transfers may be made using either the ESFR or FSER method, or both, and may involve any type of packet carrying packet switched data (or even circuit is switched data which is being used for another purpose), including packets 5, 7 and 9 of FIG. 1E. The remaining time within each window is allocated for nodes to transfer packet switched data (if any) to other nodes. Note that "priority" is given to the circuit switched data, since all such data from all nodes is transferred before any packet switched data may be transferred.

The ESFR method may also be used to "broadcast" circuit switched data to multiple ports of the same node or across multiple nodes. For example, if there is "local" circuit switched data which is intended for broadcast to multiple local ports, multiple copies of that data is simply inserted into the payload of the "empty" packet at step 148 (FIGS. 4B and 4C). In other words, multiple copies of the byte of data that is intended for broadcast are selectively placed in the payload in locations corresponding to the local ports which are to receive the broadcast. Similarly, if circuit switched data from a remote port is intended for broadcast, multiple copies of that data are inserted at step 164 into locations in the payload(s) (i.e., one packet/payload is needed for each node which has a port that is supposed to receive the broadcast) corresponding to the intended ports.

To summarize, as reflected in FIG. 4A, when the ESFR method is used to transfer data, each node in round-robin fashion transmits an "empty" packet for the purpose of collecting data from all other nodes served by the inter-nodal network 12. Upon receipt of an "empty" packet transmitted by another node, each node operates to selectively read data from one of its memories and place it in the payload of the "empty" packet. When the now "full" packet eventually returns to the node which transmitted it, the data contained within the payload is sequentially written into one of that node's receiver memories. This step marks the completion of the second stage of switching (one-way node to node) performed by the system.

The FSER Method and Combined ESFR/FSER Method

Figure 5A:
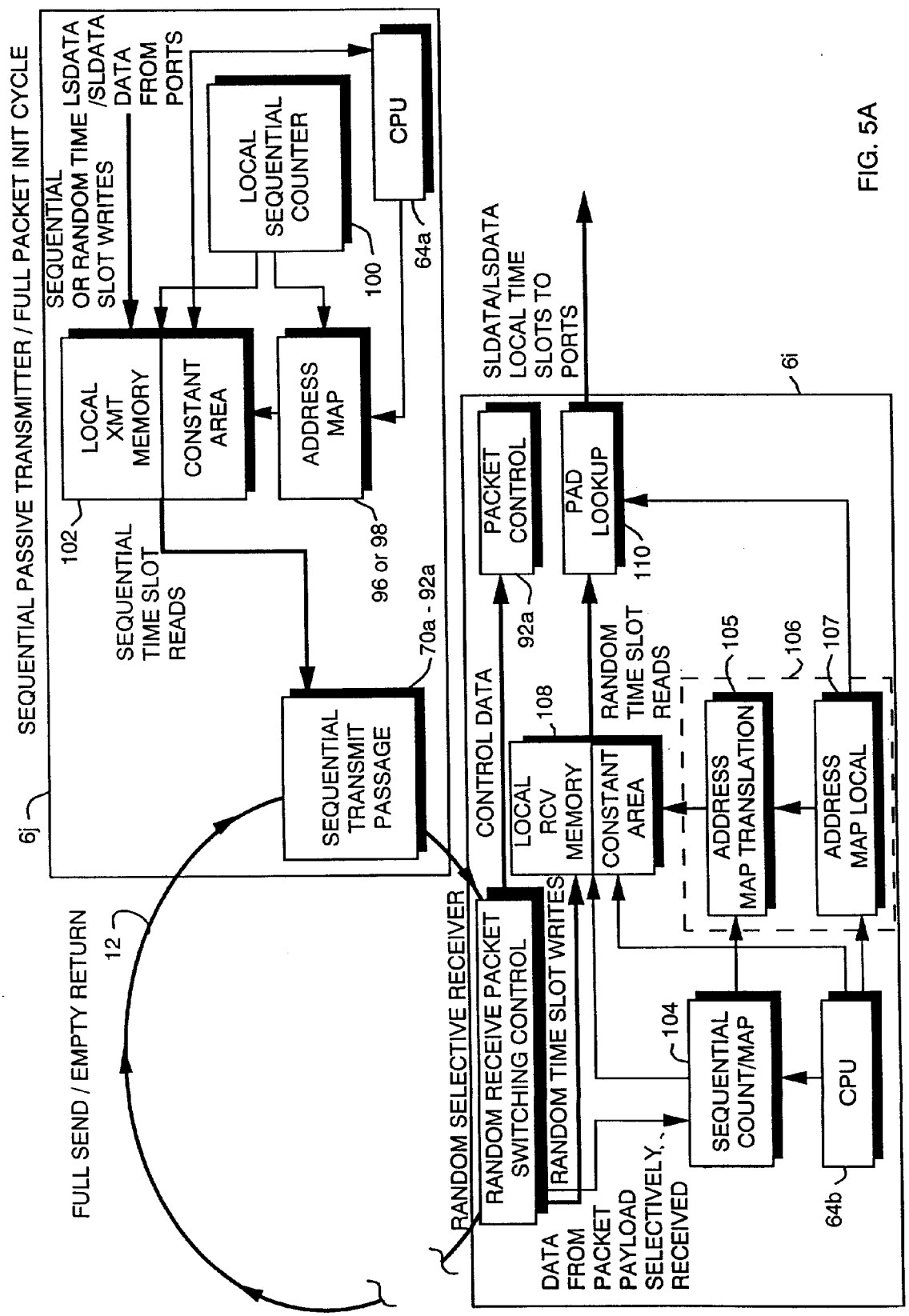
FIG. 5A is a block diagram which depicts a second method of transferring information over the inter-nodal networks of FIGS. 1A through 1D.
Figure 5B:
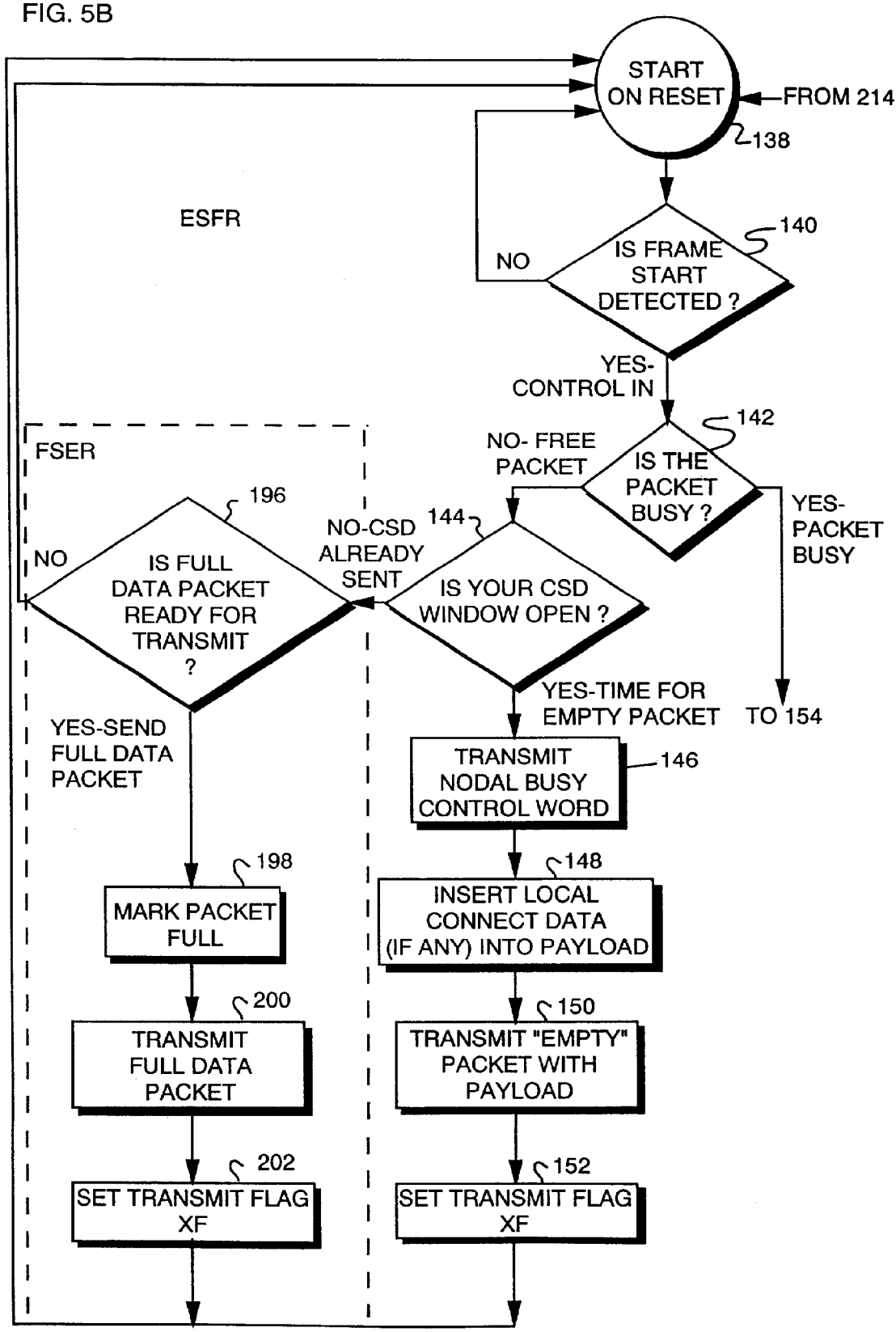
FIGS. 5B and 5C are a flowchart which depicts the detailed steps of transferring both circuit switched data and packet switched data in accordance with the method depicted in FIG. 5A.
Figure 5C:
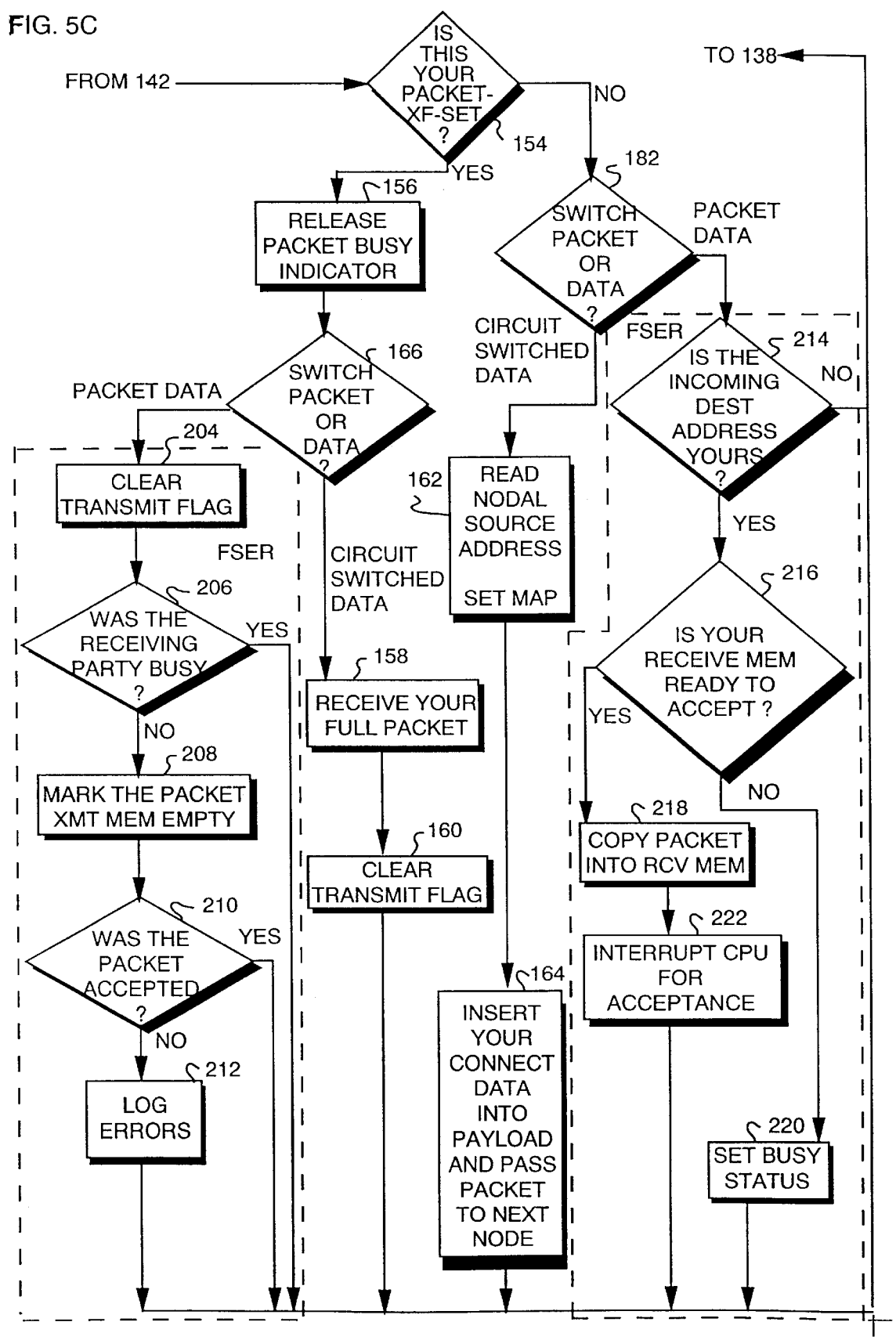

With reference to FIGS. 5A through 5C, further details of the FSER method will be described in the context of a preferred embodiment of a "combined" method in which the FSER method is used to transfer packet switched data and the ESFR method is used to transfer circuit switched data. For enhanced clarity, the portions of FIGS. 5B and 5C which represent the FSER method are enclosed with broken lines. The portions of FIGS. 5B and 5C which represent the ESFR method lie outside of the broken lines and are identical to the steps of FIGS. 4C and 4D which are denoted by like reference numbers.

At step 144, if a determination is made that the CSD window is not open, meaning that it is not the appropriate time to collect circuit switched data from other nodes, the process advances to step 196 where a determination is made whether a "full" data packet (containing packet switched data) is ready for transmission to another node. If not, the process returns to start 138 to await the arrival of another frame. If a data packet is ready, meaning that the payload of the packet is loaded with the packet switched data and an appropriate (nodal) destination address is placed in the control portion of the packet, the packet is marked "full" at step 198. The "full" data packet is then transmitted at step 200. Next, the transmit flag is set at step 202 and the process returns to start 138 to await the arrival of another frame.

Now, consider what happens when a "full" data packet which was transmitted by one node is received by another node. The process advances through steps 138, 140 and 142 to step 154 where a determination is made as to whether the receiving node's transmit flag is set. If that flag is not set, meaning that the packet originated from a different node, the process advances to step 182 where it is determined, in this example, that the packet contains packet switched data as opposed to circuit switched data. Next, at step 214, the nodal destination address of the packet is checked to determine whether the receiving node is the intended recipient of the packet. If not, the process returns to start 138. If so, the receiving node checks to see if its packet receiver memory 118 (FIG. 3A) is ready to accept the packet at step 216. If memory 118 is not ready to accept (e.g., because the memory is currently full), the process advances to step 220 where information is inserted into the status and control portion of the packet to indicate that the node was busy and was unable to accept the packet. The process then returns to start 138.

Alternatively, at step 216, if memory 118 is ready to accept the packet, the process advances to step 218 where the packet is copied into that memory. Next, at step 222, the CPU 64*b* is notified of the arrival of a packet switched data packet by an interrupt.

Lastly, we shall consider the situation where a "full" data packet returns to the node which transmitted it. In this instance, the process advances from step 138 to step 154 where it is determined that the receiving node's transmit flag is indeed set. At step 156, the packet's busy indicator is released (changed to "free") followed by a determination at step 166 of what type of data the packet contains. In this example, the packet contains packet switched data, so the process advances to step 204 where the transmit flag is cleared. Next, at step 206 a determination is made, based on information contained within the status and control portion of the packet, as to whether the node to whom the packet was addressed was busy. If so, meaning the packet was not accepted by the destination node, the process returns to start 138 to make another attempt to deliver the packet to its destination. If not, the packet transmitter memory (constant areas 124 and 128 in FIG. 3F) is marked empty at step 208. A determination is then made at step 210 whether the packet was accepted by the destination node to which it was addressed. If so, the process returns to start 138. If not, errors are logged at step 212 before returning to start 138.

It should be apparent that the FSER method may be used to transfer circuit switched data as well as packet switched data. When circuit switched data is to be transferred, each node, in turn, transmits a "full" packet whose payload is filled with circuit switched data (for all local ports) which is read sequentially from the transmitter memory 102. As a given node receives, in turn, a "full" packet transmitted by every other node, the given node takes appropriate data from the payload of each such packet and selectively writes data into its receiver memory 108 in response to addresses supplied by sequential counter/map 104. Note that the addresses supplied by counter/map 104 are "global" addresses (i.e., the combination of the implicit port address and the nodal source address), meaning each may represent any port of any node in the entire system. Because the circuit switched data corresponding to these global addresses is written to locations in memory 108 (which correspond to local ports), an address translation must be performed in order to eventually read such data out of memory 108 in the correct order. An address map translation circuit 105 receives as inputs the addresses produced by sequential counter/map 104 of memory 108 where data is stored. The addresses produced by address map local 107 are used to select constant areas within memory 108 and pad values from pad lookup 110.

Like the ESFR method, the FSER method may be used to broadcast circuit switched data to multiple ports. At a given single node, this is accomplished by making multiple copies of the data intended for broadcast from the payload of a "full" packet and selectively writing such data into multiple locations of that node's receiver memory. Similarly, different nodes may be instructed to copy the same broadcast data from the payload of a "full" packet and selectively write such data into one or more locations of those nodes' respective receiver memories, thereby effecting broadcasting across multiple nodes.

Connecting Calls Between Nodes

Having presented various alternatives for transferring information across inter-nodal network 12, a specific example of how a call is connected between ports which are physically associated with different nodes will now be described. With reference once again to FIGS. 1A, 1B, 2A and 3A through 3E, it should be kept in mind that each node 6*a*–6*h* necessarily includes at least one nodal switch 44*a*. We shall assume that a calling party whose line is interfaced with node 6*h* goes off-hook and dials a number which corresponds to a called party whose line is interfaced with node 6*e*. The host 4 receives a "request for service" message (which may include the dialed digits) from CPU 64 in node 6*h*. The host 4 determines that a connection must be established between nodes 6*h* and 6*e* and, in response, issues a "connect" message (with port address information) to both nodes' CPUs 64 to connect to each other.

Now, let us consider for a moment what happens just at node 6*h*. Circuit switched data from the calling party's line is initially passed, via bus 30*a*, from one of the line cards to nodal switch 44*a*. For purposes of this example, we shall further assume that that data is stored in transmitter memory 102. Next, if the ESFR method is used, when an "empty" packet transmitted (originated) by node 6*e* over the inter-nodal network 12 is received by node 6*h*, the circuit switched data from the calling party is time switched out of memory 102 and inserted into the payload of that packet, which will eventually return to node 6e. At this point, a one-way circuit switched connection exists between the calling party (node 6h) and node 6e, a "time" portion executed by the transmitter memory 102 and a second stage portion executed by the inter-nodal network 12. Next, node 6e's receiver 68 receives its return "full" packet containing the circuit switched data from the calling party. That data is time switched through receiver memory 108 and passed via bus 30a to the line card 20 to which the called party is interfaced. At this point, a complete one-way connection exists between the calling party (node 6h) and the called party (node 6e). Exactly the same process is repeated, in reverse, to establish the other half of the desired two-way connection.

Alternatively, the FSER method could be used to connect the same call. In that case, transmitter 102 in node 6h time switches the calling party's circuit switched data into a "full" packet which is transmitted over the inter-nodal network 12. Node 6e, upon receipt of the "full" packet, extracts the calling party's circuit switched data, stores the data in receiver memory 108, and time switches the data to the line card to which the called party is interfaced. Again, the process is carried out in reverse to establish the other half of a two-way connection.

Figure 6B:
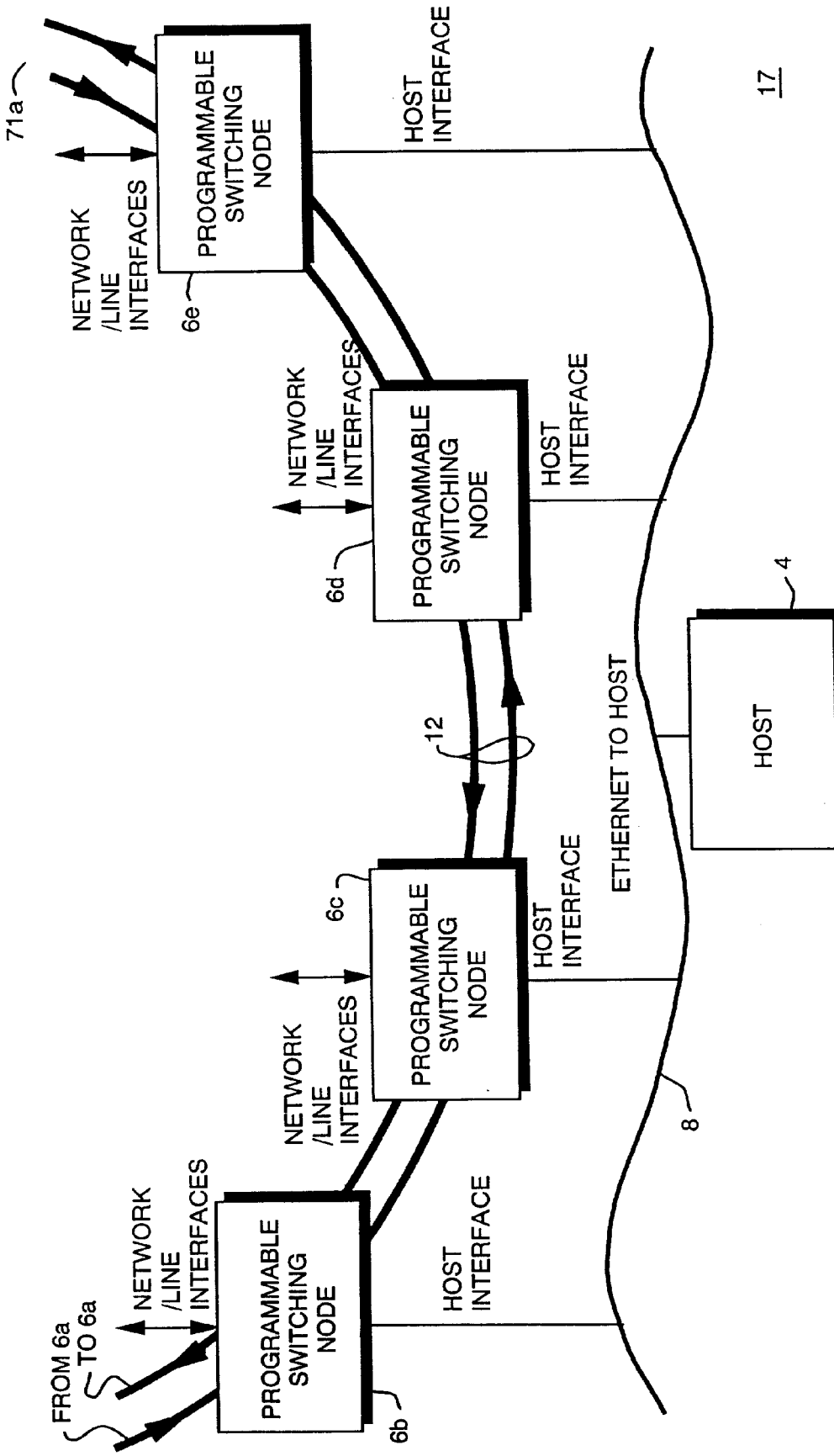

FIGS. 6A and 6B show the expandable telecommunications system 17 (FIGS. 1C and 1D) modified to illustrate the effect of a failure of programmable switching node or a portion of the inter-nodal network 12. In this example, node 6f has failed or a portion of inter-nodal network 12 has failed (or possibly a malfunction was detected and the node was taken out of service by the host 4). The nodes 6e and 6g which are adjacent to the failed node 6f begin to operate in "loopback" mode. In loopback mode, the circuitry within a node which is normally used to receive information from one ring is connected to the circuitry which is normally used to transmit information on the other ring, as denoted by reference numbers 71a and 71b in FIGS. 3A, 6A, and 6B. Thus, when a given node operates in loop back mode, all information received on one ring is immediately transmitted on the other ring. A particular node may be instructed by the host 4 to operate in loopback mode or, alternatively, operation may begin automatically in response to expiration of a "watchdog" timer.

By virtue of the loopback mode and the fact that two rings instead of one are used to form the inter-nodal network 12, the fault created by the failure of node 6f is effectively isolated from the rest of the system 17. That is, only the local ports of node 6f suffer a loss of service due to the failure of that node.

Figure 7:
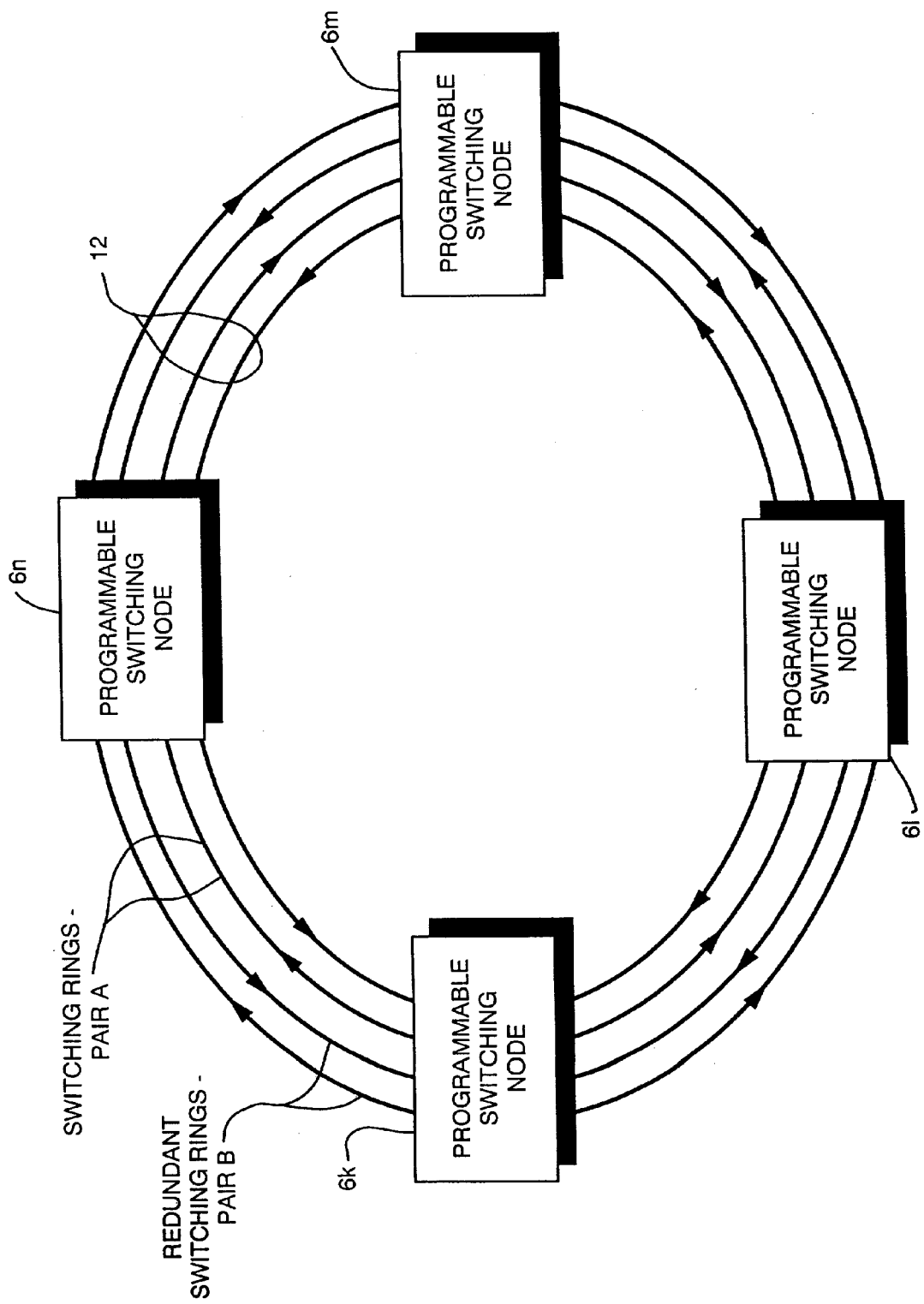
FIG. 7 is a block diagram of another embodiment of the present invention which employs two two-ring inter-nodal networks, one for redundancy, to transfer information between programmable switching nodes.

FIG. 7 shows another alternative embodiment of the present invention in which four programmable switching nodes 6k-6n are connected together by an inter-nodal network 12 which consists of one pair of rings, pair A, and one redundant pair of rings, pair B. It should be understood that this embodiment is not limited to only four switching nodes and that one or more additional nodes may be added. In this embodiment, the and width of pair A is preferably sufficiently large that under normal operating conditions, all data (i.e., circuit switched and packet switched) may be transferred by that pair alone. Pair B preferably has comparable bandwidth to that of pair A and remains in a "'standby" mode under normal conditions. In the event of a failure of either of pair A's rings, pair B enters a regular operating mode and assumes responsibility for transferring all of the data. Also, it is preferable that only one pair of rings is "active," but that both pairs actually transfer information between nodes in parallel. This is to ensure that, in the event of a failure of the "active" ring, connections (calls) which are already established can be maintained and not dropped.

Figure 8A:
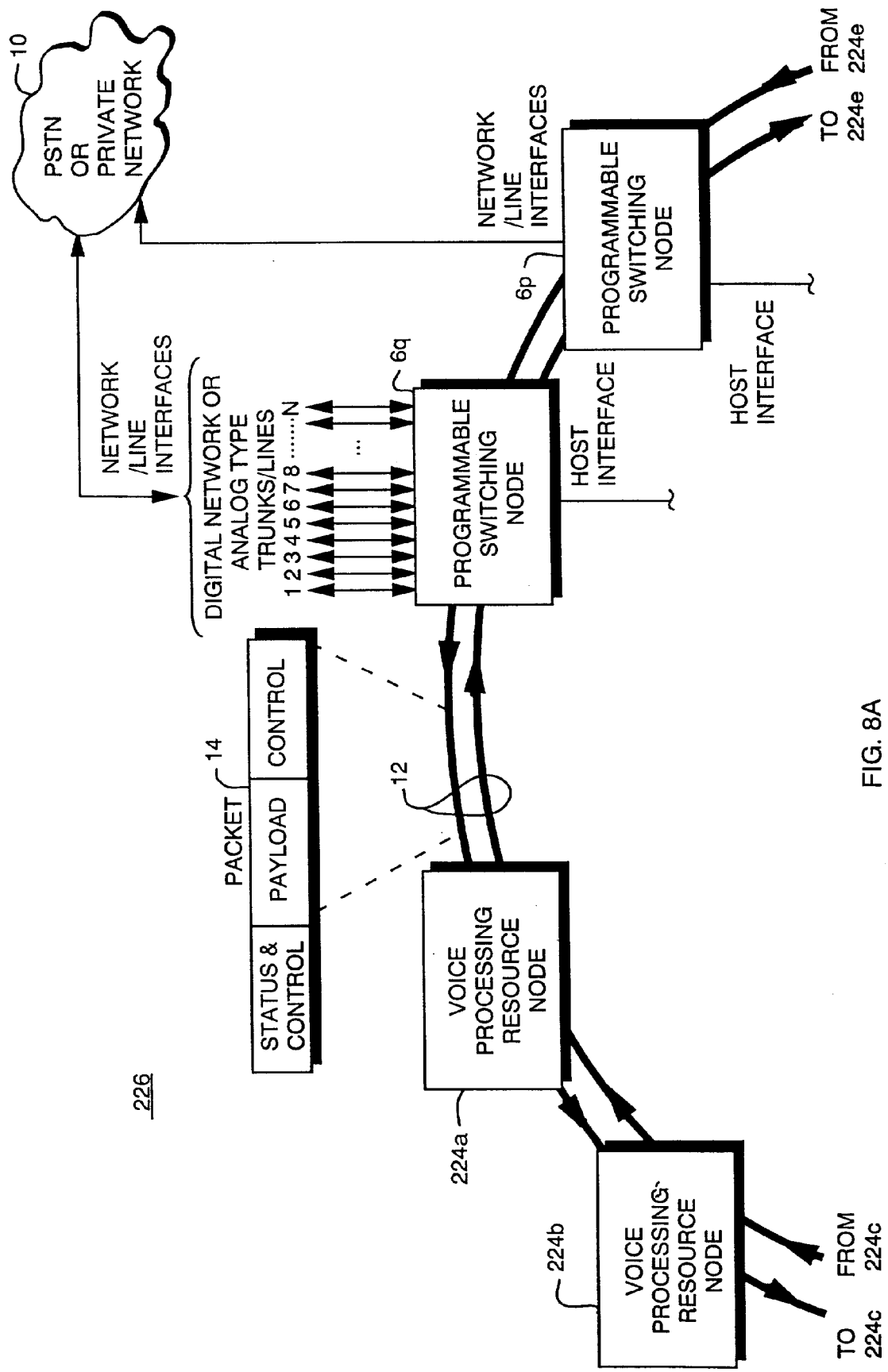
FIGS. 8A and 8B are a block diagram of another embodiment of the present invention which employs an inter-nodal network to transfer information between one or more programmable switching nodes and one or more voice processing resources nodes.
Figure 8B:
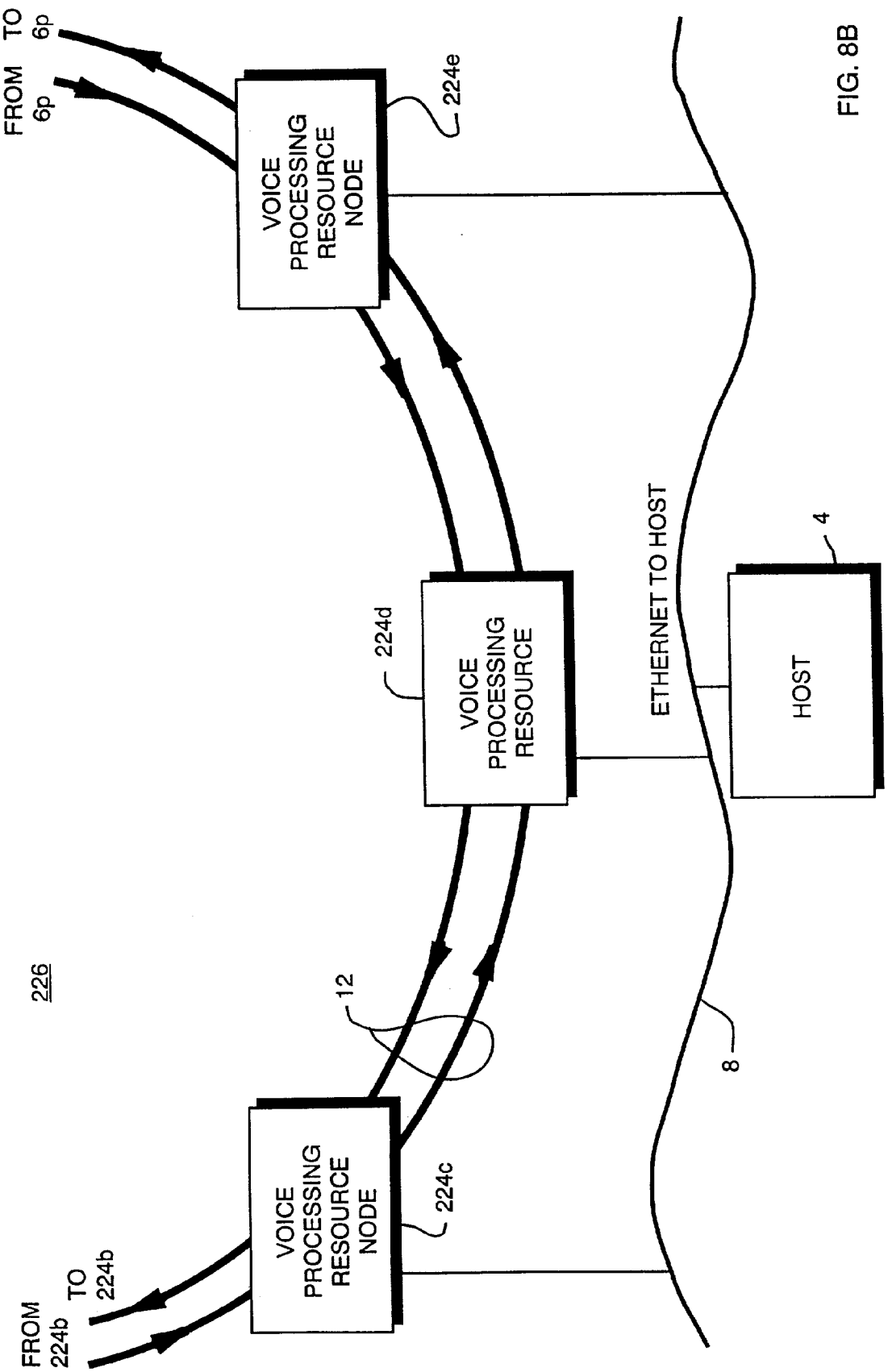

FIGS. 8A and 8B depict another alternative embodiment of the present invention in which a two-ring inter-nodal network 12 is used to connect a plurality of voice processing resources 224a–224e with a plurality of programmable switching nodes 6p and 6q to provide a voice processing system 226. (A single ring network could also be used). Voice processing resources 224a–224e may represent the same or different call processing or communications services including voice mail, interactive voice response, fax mail, voice messaging or other enhanced services or data processing services. Because voice processing resources 224a–224e do not include any network/line interfaces (and therefore require no framing information), those resources may advantageously operate asynchronously with respect to the PSTN (or private network) 10. In addition, resources 224a–224e may be configured to appear as servers with respect to each client host 4.

Figure 8C:
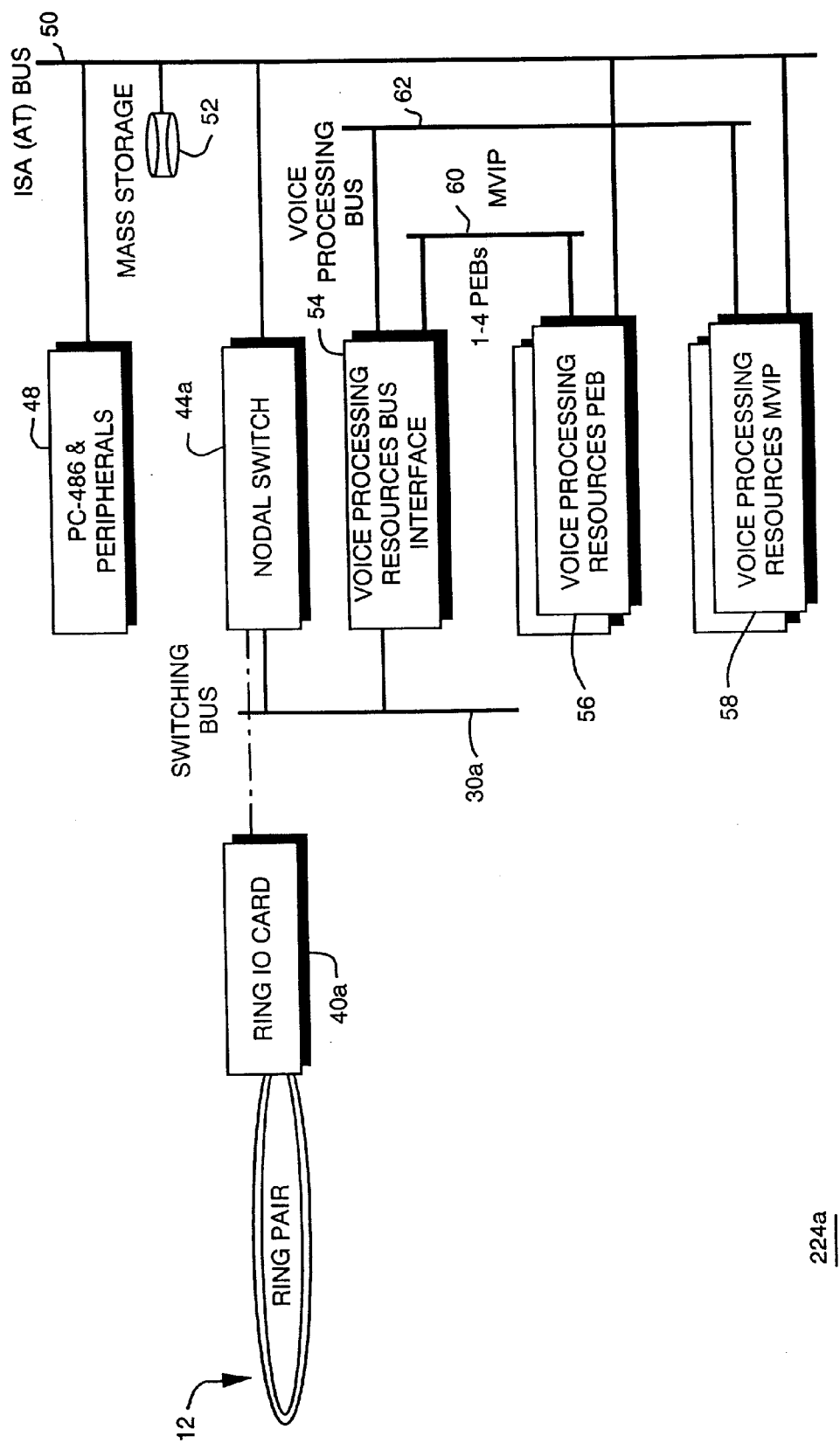
FIG. 8C is a block diagram of one of the voice processing resource nodes shown in FIGS. 8A and 8B.

FIG. 8C shows a preferred embodiment of voice processing resource 224a. Note that the components of resource 224a are essentially the same as those of the switching node 6 shown in FIGS. 2B and 2C, except that resource 224a does not require and does not have any line cards or other cards (i.e., MFDSP and ISDN-24) normally needed for network/line interfaces.

All voice processing resources 224a–224e preferably appear as nodes on the intern-nodal network 12 and have the same access to the bandwidth as other (switching) nodes. Such access is highly advantageous because it permits any resource 224a–224e to dynamically provide desired services to any port served by the system 226. For example, assume that a caller on a local port of node 6q wishes to access a voice mail system to either leave a message for someone who did not answer or to retrieve messages. Using either the ESFR or FSER method, the caller may be connected with any of voice processing resources 224a–224e. Assuming that one of those resources is a voice mail system, the caller is provided with the desired service. Of course, the caller may likewise be connected to any of the other voice processing resources which are served by the inter-nodal network 12.

Figure 9A:
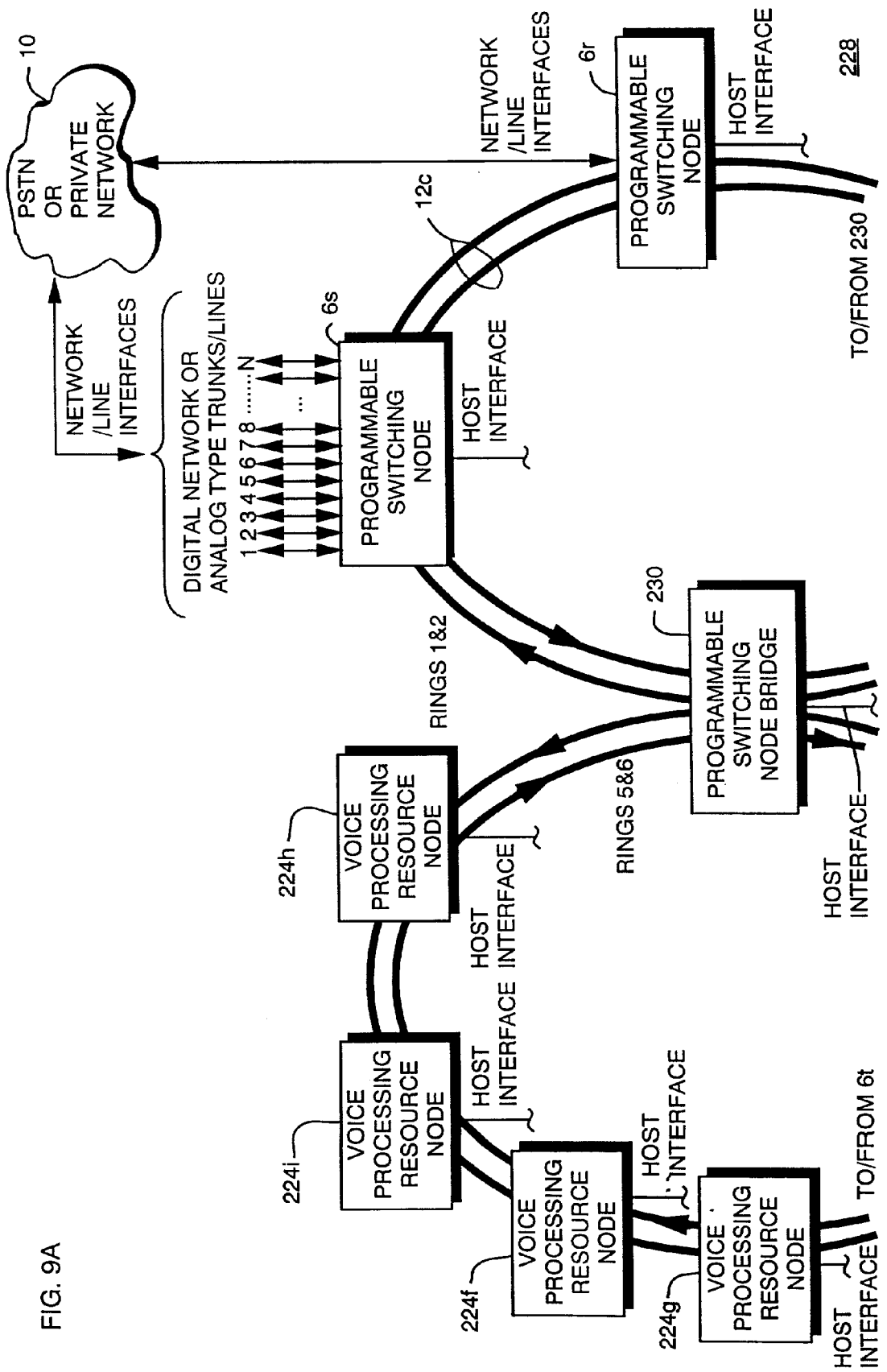
FIGS. 9A and 9B are a block diagram of another embodiment of the present invention which employs a programmable switching node as a bridge between two intern-nodal networks.
Figure 9B:
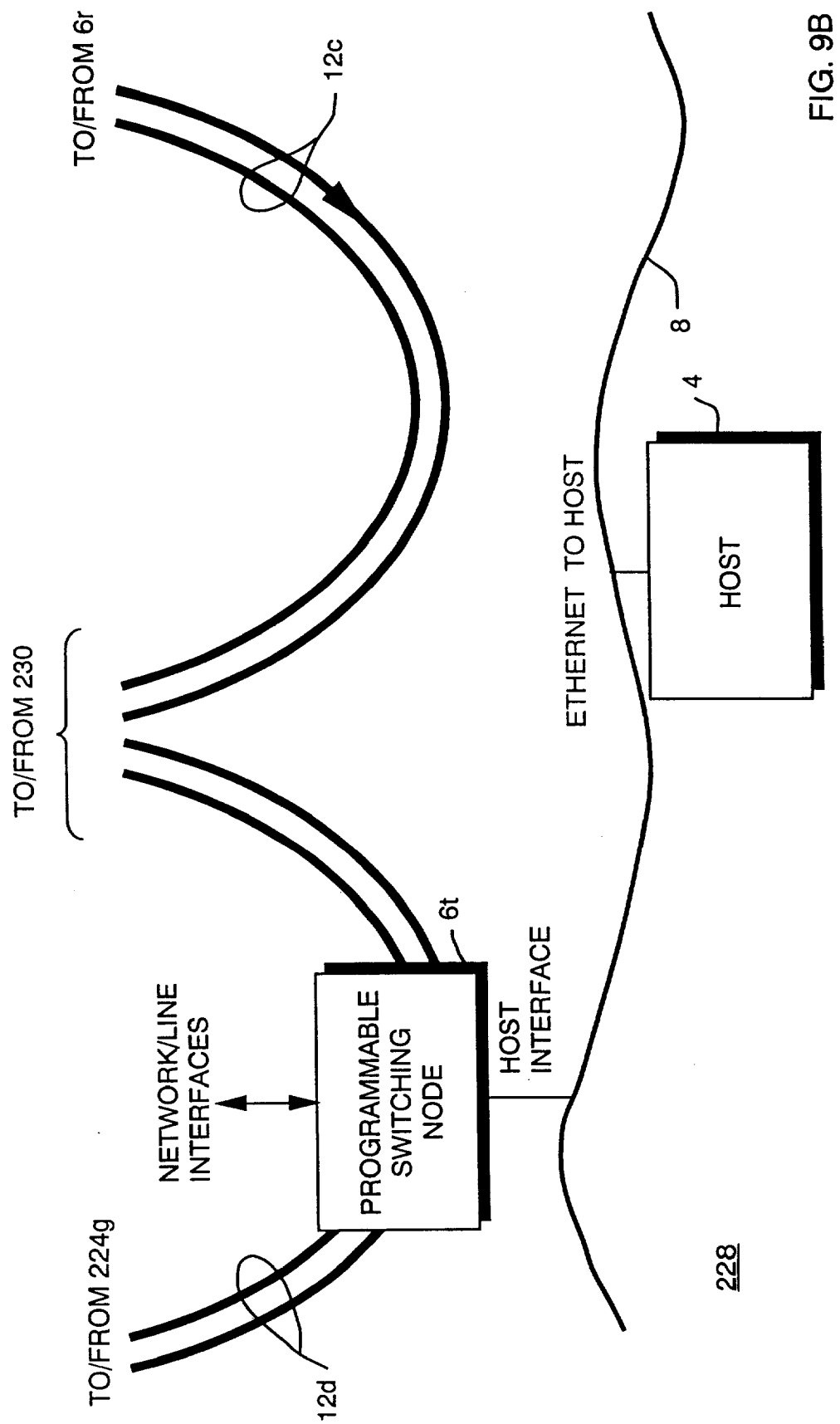

FIGS. 9A and 9B show yet another embodiment of the present invention in which multiple inter-nodal networks are connected together to form a system 228 having even greater switching capacity or combined switching/voice processing capacity. A first two-ring inter-nodal network 12c (which provides switching capacity through programmable switching nodes 6r and 6s), is connected to a second two-ring inter-nodal network 12d (which provides voice processing capacity through nodes 224f–224i and switching capacity through node 6t) by a programmable switching node bridge 230. For purposes of enhanced clarity, an additional pair of redundant rings for each of networks 12c and 12d is omitted from this figure.

Bridge 230 appears as a node on both inter-nodal networks 12c and 12d and is therefore interfaced with each of rings 1, 2, 5 and 6. By virtue of its access to both inter-nodal networks, bridge 230 is operable to exchange information bidirectionally between networks 12c and 12d. For example, bridge 230 may effectively connect any local port of node 6r or 6s (or any other node of network 12c) to any voice processing resource 224f–224i or local port of switching node 6t of network 12d. Inter-nodal networks 12c and 12d may operate at different speeds without adversely affecting bridge 230.

Figure 9C:
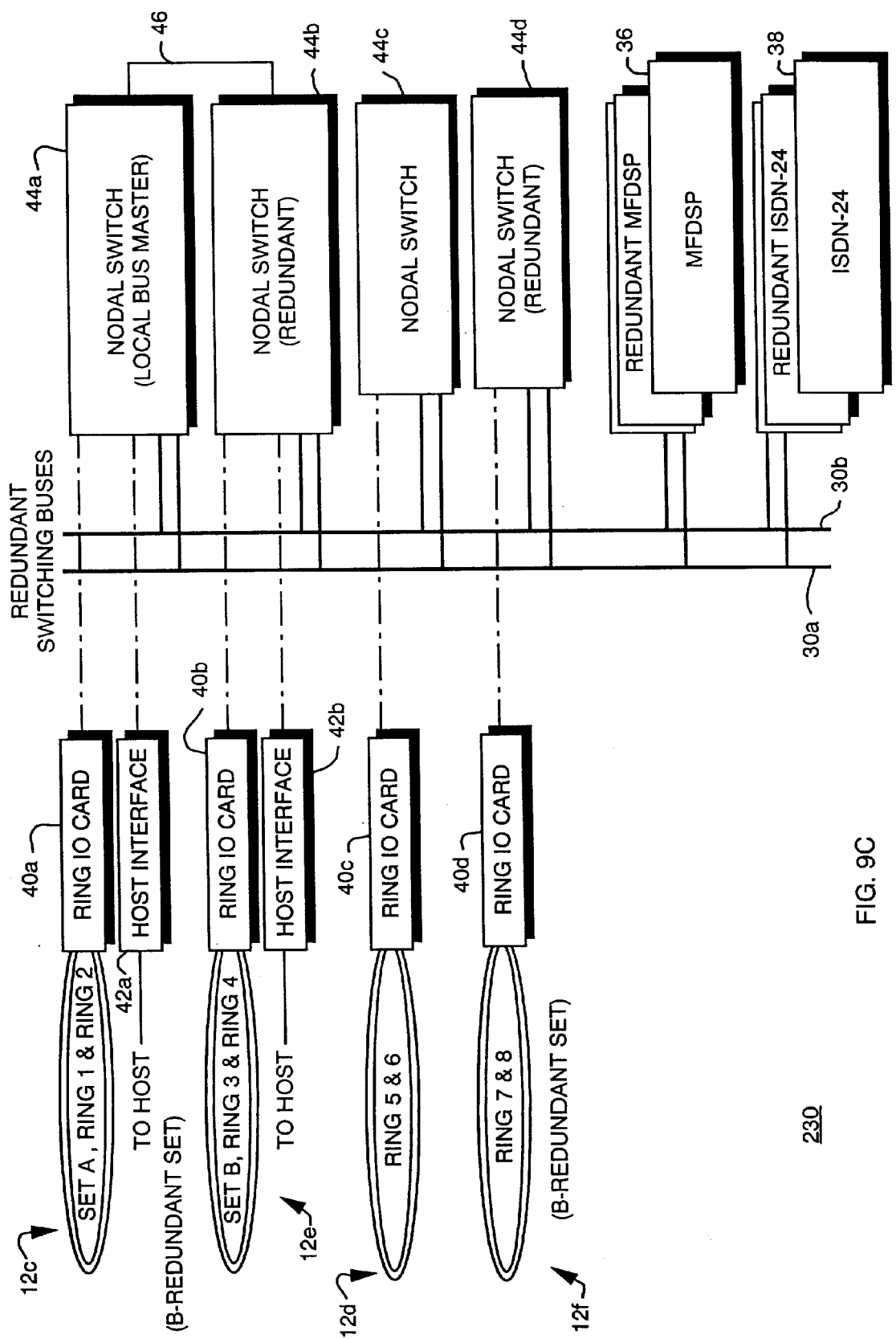
FIG. 9C is a block diagram of the bridge node shown in FIGS. 9A and 9B.

As shown in FIG. 9C, bridge 230 includes essentially the same components as a programmable switching node, but also includes two additional ring IO cards 40c and 40d, and two additional nodal switches 44c and 44d which permit bridge 230 to interface with two additional inter-nodal networks 12e and 12f. Although only two additional nodal switches 44c and 44d are shown, it is possible to add even more such switches, all of which will cooperate in the manner about to be described. Also, bridge 230 does not require any network/line interfaces (or associated IO cards and line cards), although it may optionally include such components.

With reference now to both FIGS. 3A through 3C and 9C, an example of how information may be transferred between inter-nodal networks 12c and 12d will be described. First, one should understand that FIGS. 3A through 3E illustrate the basic hardware each of nodal switches 44a–44d of bridge 230. That is, each nodal switch 44a–44d is essentially a replica of the switch disclosed in FIGS. 3A through 3E. Nodal switch 44a is configured as the local bus master (active), and nodal switch 44b is configured as a redundant local bus master. Nodal switch 44c is configured as a standard nodal switch (active), and nodal switch 44d is configured as a redundant standard nodal switch.

It may be recalled that each nodal switch 44a–44d includes a transmitter memory 102 which is operable for storing circuit switched data that is flowing in a direction from a line card to a switch (LSDATA) or, alternately, from a switch to a line card (SLDATA). Similarly, each switch's receiver memory 108 is operable for outputting either LSDATA or SLDATA. As there are no line cards included in bridge 230 (although there may be such cards), it may be conceptually helpful to think of LSDATA as circuit switched data which is flowing in a direction from nodal switch 44c (and 44d) to nodal switch 44a (and 44b), and to think of SLDATA as circuit switched data which is flowing in a direction from nodal switch 44a (and 44b) to nodal switch 44c (and 44d). For purposes of this discussion, it is assumed that nodal switches 44a and 44b are actually configured to accept and store LSDATA in their transmitter memories 102 and to output SLDATA from their receiver memories 108. It is further assumed that nodal switches 44c and 44d are configured to accept and store SLDATA in their transmitter memories 102 and to output LSDATA from their receiver memories 108.

The objective of this arrangement is that whatever circuit switched data (including data received from inter-nodal network 12c) that is time switched through nodal switch 44a (or 44b, if it becomes active) is passed to nodal switch 44c (and 44d). In turn, nodal switch 44c is operable to transfer data it receives from switch 44a onto inter-nodal network 12d. The converse is also true, meaning that all circuit switched data (including data received from inter-nodal network 12d) that is time switched through nodal switch 4c (or 44d, if it becomes active) is supplied to nodal switch 44a (and 44b), from which such data or portions thereof may be transferred over inter-nodal network 12c. Thus, the combined effect of this arrangement is that circuit switched data which originates from any node on either inter-nodal network 12c or 12d may be transferred to any other node on either network. Packet switched data is transferred by bridge 230 from nodal switch to nodal switch across the bridge's HDLC bus.

In terms of implementing desired redundancy features, communications services provided by MFDSP cards 36 and ISDN-24 cards 38 as well as even further expansion of the telecommunications system, space switch control circuit 112 (FIG. 3C) is instrumental. The function of circuit 112 is to permit, on a time slot-by-time slot basis, one and only one device of all of the nodal switches 44, MFDSP cards 36 and ISDN-24 cards 38 to transmit circuit switched data over bus 30a. In terms of redundancy features, circuit 112 has the following effect. When nodal switch 44a is active and functioning properly, circuit 112 within redundant switch 44b will effectively prevent switch 44b from transmitting any circuit switched data over bus 30a, although 44a is permitted to receive all data passing over that bus. Should nodal switch 44a fail, then circuit 112 would permit redundant switch 44b to commence transmitting data over bus 30a during those time slots in which switch 44a, if functioning properly, would normally transmit. The same considerations apply to switch 44c and its redundant pair switch 44d.

In terms of communications services, circuit 112 operates to dynamically prevent nodal switches 44a and 44c from effectively transmitting circuit switched data over bus 30a during time slots in which a service is being provided by any of cards 36 or 38. Details of how "ownership" or the authority to transmit data during a given time slot may be dynamically passed from one device to another (and back again) are disclosed in co-pending application Ser. No. 08/001,113, incorporated by reference above.

The role of circuit 112 in connection with even further expansion of a telecommunications system is described in connection with FIGS. 10B and 10C.

Figure 10A:
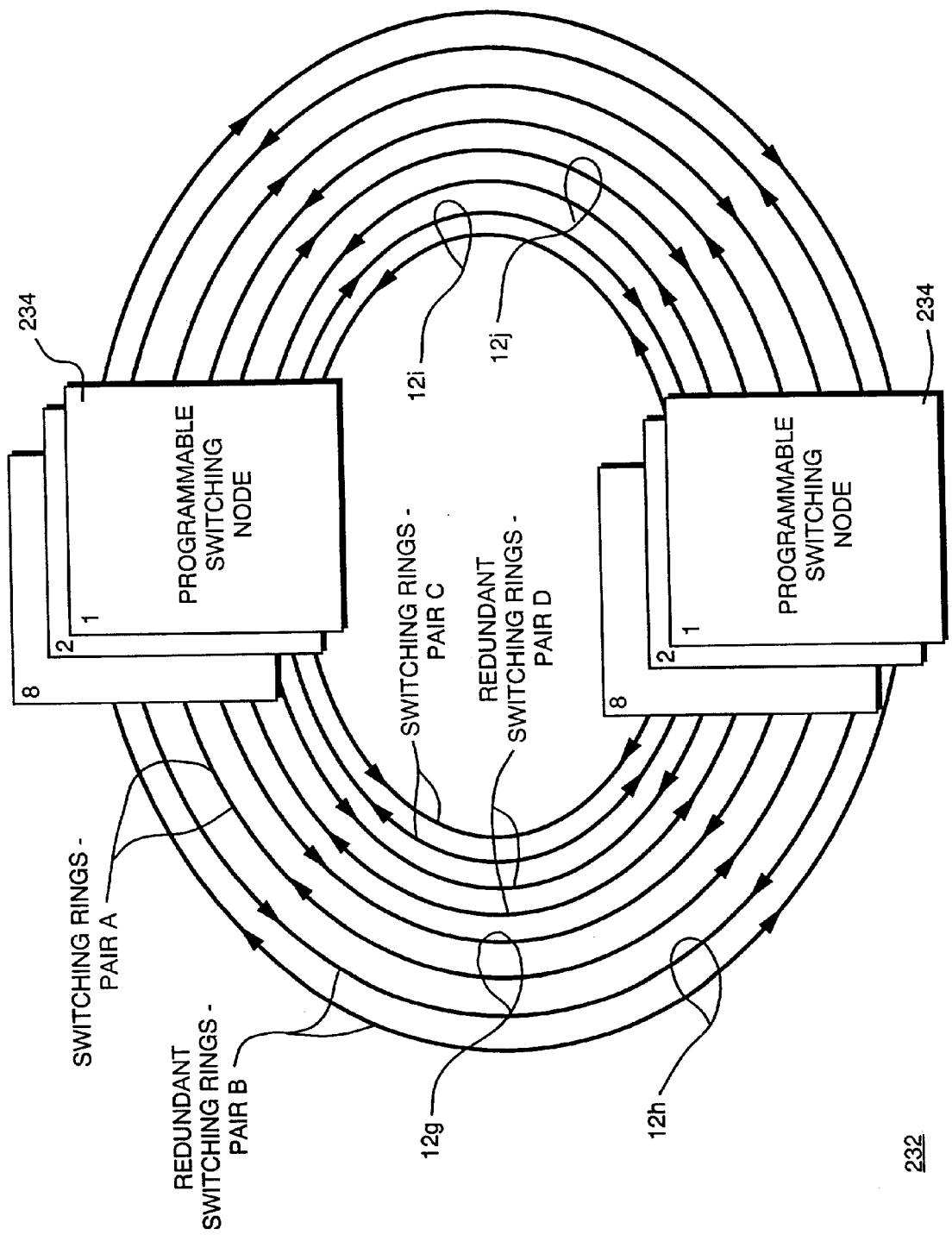
FIG. 10A is a block diagram of another embodiment of the present invention which employs eight rings to transfer information between programmable switching nodes, demonstrating the further expandability of the switching system.

FIG. 10A shows another embodiment of the present invention in which up to sixteen programmable switching nodes 234 are connected together by four inter-nodal networks 12g–12j (a total of eight rings) to form an expanded telecommunications switching system 232. Although only sixteen nodes are illustrated, it should be understood that the number of nodes may be greater depending upon the switching capacity of each node and the rate at which information may be transferred over the inter-nodal networks 12g–12j. It should also be apparent that even further expansion of the switching capacity of system 232 may be achieved by adding additional inter-nodal networks.

Under normal operating conditions, inter-nodal networks 12g and 12i are preferably active and are used to transfer all information between all nodes. The remaining inter-nodal networks 12h and 12j preferably have comparable bandwidth to that of 12g and 12i and transfer information is parallel with 12h and 12j, but remain in a "standby" mode. In the event of a failure of either of the rings of networks 12g and 12i, the corresponding redundant network becomes active.

Figure 10B:
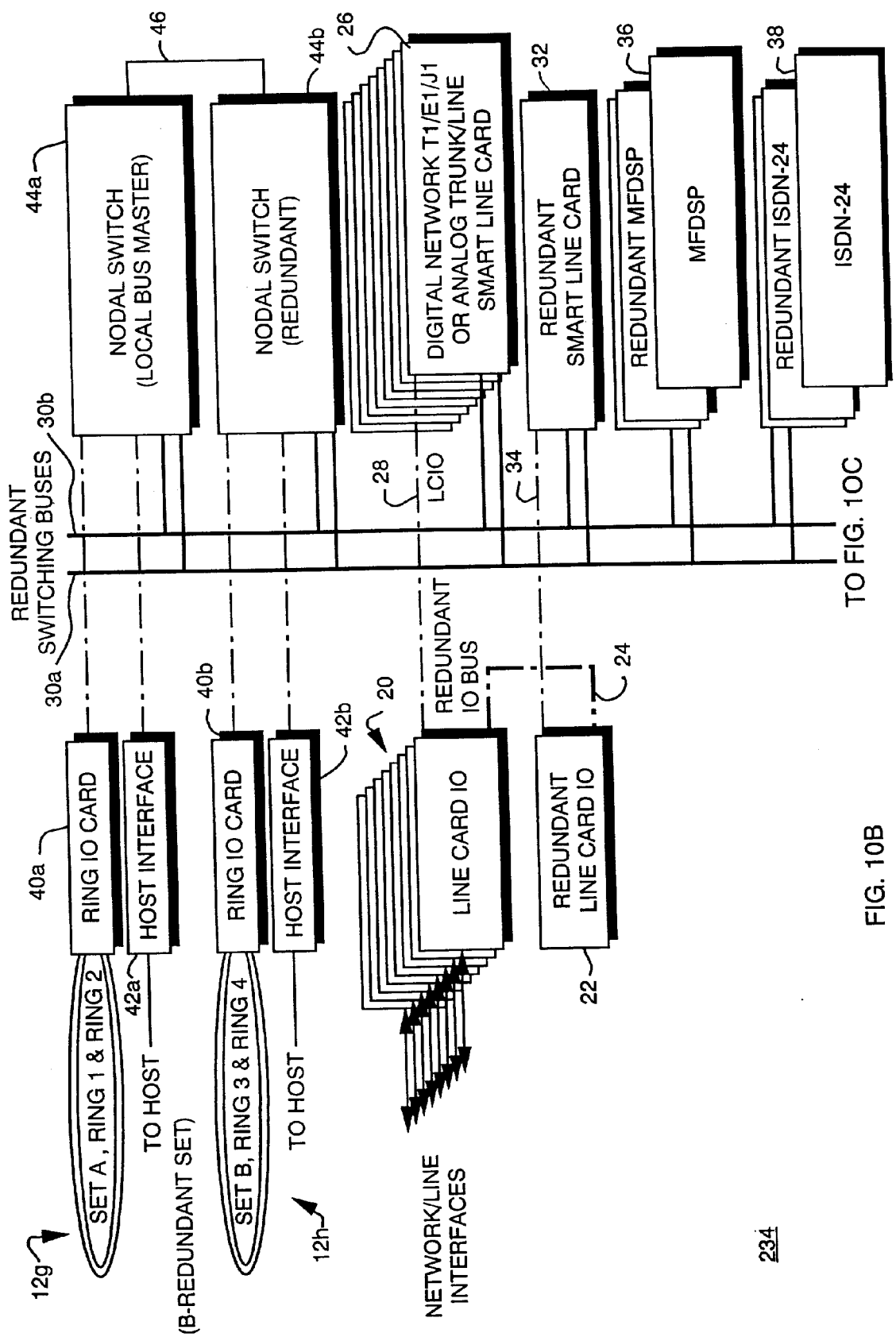
FIGS. 10B and 10C are a block diagram of one of the switching nodes of FIG. 10A.
Figure 10C:
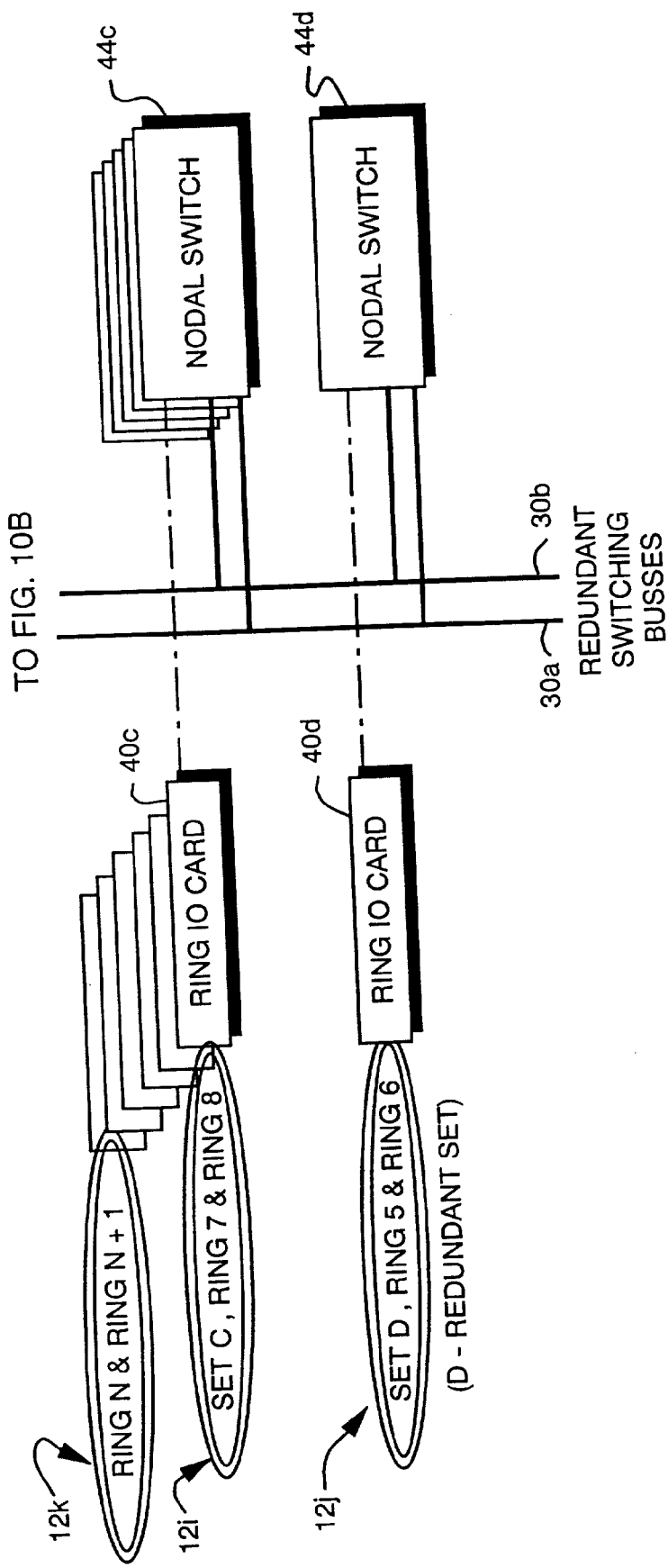

FIGS. 10B and 10C show the major components of one of nodes 234. The components and their operation are comparable to those discussed earlier in connection with other figures. Note that by adding additional ring IO cards 40 and nodal switches 44, additional inter-nodal networks 12k may be added to system 234, thereby even further expanding the switching capacity of system 232.

As mentioned above, space switch control circuit 112 (FIG. 3C) plays a role in system 234. Circuit 112's function is to ensure, on a time slot-by-time slot basis, that one and only one of the multiple, non-redundant nodal switches 44a, 44c and 44d present (as well as any MFDSP cards 36 and ISDN-24 cards 38 which are present) effectively transmits circuit switched data over bus 30a. Thus, control circuit 112 enables multiple nodal switches (even beyond those shown) to be added to a node, even further increasing the overall switching capacity of the system.

The foregoing description has been limited to a specific embodiment of this invention. It will be apparent, however, that variations and modifications may be made to the invention, with the attainment of some or all of the advantages of the invention.

Therefore, it is the object of the appended claims to cover all such variations and modifications as come within the true spirit and scope of the invention.

What is claimed as new and desired to be secured by Letters Patent of the United States is:

1. An expandable telecommunications system comprising:
   a plurality of programmable switches, dynamically connecting or disconnecting communication paths with respect to various ones of a plurality of ports, each of said programmable switches including a nodal switch that time switches information to or from said ports, each of said nodal switches having a switching capacity corresponding to a maximum number of ports that may be physically associated with the system, a transmitter and a receiver connected in communicating relationship with each said nodal switch for interfacing with one or more public or private networks which represents said ports, said communicating relationship including a bus structure that carries a type of packet that may include at least one of packet switched and circuit switched information to and from said ports; and
   an inter-nodal network interconnecting the plurality of programmable switches in communicating relationship and operable to transfer packetized information among the programmable switches such that information including both packet switched data and is circuit switched data, which originates from any port of any of the programmable switches, is substantially continuously communicable to any other port of the same or a different programmable switch.

2. The expandable telecommunications system of claim 1 further comprising a medium for carrying the packetized information in the form of optical signals, the medium providing one or more channels each of which is operable to carry all or some of the packetized information.

3. The expandable telecommunications system of claim 2 further comprising a first medium and a second medium for carrying the packetized information in the form of optical signals, the second medium increasing the switching capacity of the system and providing fault isolation with respect to the plurality of programmable switches.

4. The expandable telecommunications system of claim 2 further comprising a plurality of media for carrying the packetized information in the form of optical signals, the plurality of media increasing the switching capacity of the system.

5. The system as in claim 1 wherein one or more of the programmable switches comprises a nodal switch which is controllable by a host device.

6. The system as in claim 5 wherein one or more of the programmable switches is operable as a server which is controlled by one or more host devices which are operable as clients.

7. The system as in claim 6 wherein the host devices and the programmable switches are connected in communicating relationship by a local area network.

8. The system as in claim 1 further comprising a host device connected in communicating relationship with one of the plurality of programmable switches, the host device operable to control the programmable switches to which it is connected, and operable to control other ones of the plurality of programmable switches by information transferred by the network.

9. The system as in claim 1 wherein the plurality of programmable switches operate synchronously with respect to one or more public or private networks which represent the ports, and the network operates asynchronously with respect to the one or more public or private networks.

10. The system as in claim 1 wherein the network comprises a local area network.

11. The system as in claim 1 wherein the network comprises a wireless communication network.

12. The system as in claim 1 wherein the network comprises a synchronous optical network.

13. The system as in claim 1 wherein the network comprises an asynchronous transfer mode network.

14. The system as in claim 1 wherein the network comprises a portion of a public switched telephone network.

15. The system as in claim 1 wherein the packetized information transferred by the network includes packet switched data.

16. The system as in claim 1 wherein the packetized information transferred by the network is carried by one or more packets each of which includes control and address information and a payload portion for carrying data.

17. The system as in claim 16 wherein the one or more packets include packets of variable lengths to transfer information over the network.

18. The system as in claim 16 wherein the circuit switched data transferred by the network is arranged in a predetermined order within each of the one or more packets, whereby the order represents address information for determining the ports to which the circuit switched data corresponds.

19. The system as in claim 1 wherein one or more of the programmable switches includes a plurality of nodal switches and one or more switch control circuits, the switch control circuits for dynamically enabling one and only one of the plurality of nodal switches to transmit circuit switched data to a bus.

20. The system as in claim 1 wherein the system is non-blocking.

21. The system as in claim 1 wherein one or more voice processing resources are connected to the network, whereby each of the voice processing resources has access to circuit switched data which originates from any port of the system.

22. An expandable telecommunications system comprising:
   a plurality of programmable switches, dynamically connecting or disconnecting communication paths with respect to various ones of a plurality of ports, each of said programmable switches including a nodal switch that time switches information to or from said ports, each of said nodal switches having a switching capacity corresponding to a maximum number of ports that may be physically associated with the system, a transmitter and a receiver connected in communicating relationship with each said nodal switch for interfacing with one or more public or private networks which represents said ports, said communicating relationship including a bus structure that carries a type of packet that may include at least one of packet switched and circuit switched information to and from said ports; and
   an inter-nodal network interconnecting the plurality of programmable switches in communicating relationship and operable to perform up to three levels of switching with respect to information originating from any of the ports, a first level of switching being performed by the programmable switch which is physically associated with the one of the ports from which the information originates, a second level of switching being performed by a network interface associated with each programmable switch in conjunction with the network, and a third level of switching being performed by the programmable switch which is physically associated with the one of the ports for which the information is destined.

23. The system as in claim 22 wherein each of the programmable switches has a switching capacity corresponding to a maximum number of ports that may be physically associated therewith.

24. The system as in claim 22 wherein information, including circuit switched data, which originates from any port of any one of the programmable switches is substantially continuously communicable to any other port of the same or different programmable switches.

25. The system as in claim 22 wherein the network comprises a medium for carrying the packetized information in the form of optical signals, the medium providing one or more channels each of which is operable to carry all or some of the packetized information.

26. The system as in claim 25 wherein the network comprises a first medium and a second medium for carrying the packetized information in the form of optical signals, the second medium increasing the switching capacity of the system and providing fault isolation with respect to the plurality of programmable switches.

27. The system as in claim 25 wherein the network comprises a plurality of media for carrying the packetized information in the form of optical signals, the plurality of media for increasing the switching capacity of the system.

28. The system as in claim 22 wherein one or more of the programmable switches comprises a programmable switch which is controllable by a host device.

29. The system as in claim 28 wherein one or more of the programmable switches is operable as a server which is controlled by one or more host devices which are operable as clients.

30. The system as in claim 29 wherein the host devices and the programmable switches are connected in communicating relationship by a local area network.

31. The system as in claim 22 further comprising a host device connected in communicating relationship with one of the plurality of programmable switches, the host device operable to control the programmable switches to which it is connected, and operable to control other ones of the plurality of programmable switches by information transferred by the network.

32. The system as in claim 31 wherein the communicating relationship between the host device and the one of the plurality of programmable switches is provided by an asynchronous communication link.

33. The system as in claim 22 further comprising a host device operable to control each of the programmable switches and connected by an asynchronous communication link.

34. The system as in claim 22 wherein the plurality of programmable switches operate synchronously with respect to one or more public or private networks which represent the ports, and the network operates asynchronously with respect to the one or more public or private networks.

35. The system as in claim 22 wherein the network comprises a local area network.

36. The system as in claim 22 wherein the network comprises a wireless communication network.

37. The system as in claim 22 wherein the network comprises a synchronous optical network.

38. The system as in claim 22 wherein the network comprises an asynchronous transfer mode network.

39. The system as in claim 22 wherein the network comprises a portion of a public switched telephone network.

40. The system as in claim 22 wherein the information transferred by the network includes packet switched data.

41. The system as in claim 22 wherein the packetized information transferred by the network is carried by one or more packets each of which includes control and address information and a payload portion for carrying data.

42. The system as in claim 41 wherein the one or more packets include packets of variable lengths to transfer information over the network.

43. The system as in claim 41 wherein the packetized information includes circuit switched data arranged in a predetermined order within each of the one or more packets, whereby the order represents address information for determining the ports to which the circuit switched data corresponds.

44. The system as in claim 22 wherein one or more of the programmable switches includes a plurality of nodal switches and one or more switch control circuits, the switch control circuits dynamically enabling one and only one of the plurality of nodal switches to transmit circuit switched data to the bus.

45. The system as in claim 22 wherein the system is non-blocking.

46. The system as in claim 22 further comprising one or more voice processing resources connected to the network, whereby each of the voice processing resources has access to circuit switched data which originates from any port of the system.

47. An expandable telecommunications system comprising:
(a) a plurality of programmable switches, each of the switches including a nodal switch for dynamically connecting or disconnecting communication paths with respect to various ones of a plurality of ports connected in communicating relationship with the nodal switch, the communicating relationship including a bus for carrying data to and from the ports;
(b) an inter-nodal network for interconnecting the programmable switches in communicating relationship and operable to transfer packetized information such that information, including circuit switched data, which originates from any port of any of the programmable switches is substantially continuously communicable to any node interfaced with the network; and
(c) a plurality of service nodes, each of the services nodes interfaced with the network, whereby any of the service nodes may dynamically provide telecommunications services with respect to any port of any of the programmable switches.

48. The system as in claim 47 wherein each of the nodal switches has a switching capacity corresponding to a maximum number of ports that may be physically associated therewith.

49. The system as in claim 47 wherein the network comprises a medium for carrying the packetized information in the form of optical signals, the medium providing one or more channels each of which is operable to carry all or some of the packetized information.

50. The system as in claim 49 wherein the network comprises a first medium and a second medium for carrying the packetized information in the form of optical signals, the second medium increasing the switching capacity of the system and providing fault isolation with respect to the plurality of programmable switches.

51. The system as in claim 49 wherein the network comprises a plurality of media for carrying the packetized information in the form of optical signals, the plurality of media increasing the switching capacity of the system.

52. The system as in claim 47 wherein one or more of the programmable switches comprises a programmable switch which is controllable by a host device.

53. The system as in claim 52 wherein one or more of the programmable switches is operable as a server which is controlled by one or more host devices which are operable as clients.

54. The system as in claim 53 wherein the host devices and the programmable switches are connected in communicating relationship by a local area network.

55. The system as in claim 47 further comprising a host device connected in communicating relationship with one of the programmable switches, the host device operable to control the programmable switch to which it is connected, and operable to control other ones of the plurality of programmable switches by information transferred by the network.

56. The system as in claim 55 wherein the communicating relationship between the host device and the one of the programmable switches is provided by an asynchronous communication link.

57. The system as in claim 47 further comprising a host device operable to control each of the programmable switches and connected by an asynchronous communication link with each of the programmable switches.

58. The system as in claim 47 wherein the plurality of programmable switches operate synchronously with respect to one or more public or private networks which represent the ports, and the network operates asynchronously with respect to the one or more public or private networks.

59. The system as in claim 47 wherein the network comprises a local area network.

60. The system as in claim 47 wherein the network comprises a wireless communication network.

61. The system as in claim 47 wherein the network comprises a synchronous optical network.

62. The system as in claim 47 wherein the network comprises an asynchronous transfer mode network.

63. The system as in claim 47 wherein the network comprises a portion of a public switched telephone network.

64. The system as in claim 47 wherein the information transferred by the network includes packet switched data.

65. The system as in claim 47 wherein the packetized information transferred by the network is carried by one or more packets each of which includes control and address information and a payload portion for carrying data.

66. The system as in claim 65 wherein the one or more packets include packets of variable lengths to transfer information over the network.

67. The system as in claim 65 wherein the packetized information includes circuit switched data arranged in a predetermined order within the one or more packets, whereby the order represents address information for determining the ports to which the circuit switched data corresponds.

68. The system as in claim 47 wherein one or more of the programmable switches includes multiple nodal switches and one or more switch control circuits, the switch control circuits dynamically enabling one and only one of the multiple nodal switches to transmit circuit switched data to the bus.

69. The system as in claim 47 wherein the system is non-blocking.

70. The system as in claim 47 wherein one or more of the services nodes provides voice mail services.

71. The system as in claim 47 wherein one or more of the services nodes provides interactive voice response services.

72. The system as in claim 47 wherein one or more of the services nodes provides fax mail services.

73. The system as in claim 47 wherein one or more of the services nodes provides voice messaging services.

74. The system as in claim 47 wherein one or more of the services nodes provides wireless communications services.

75. The system as in claim 47 wherein one or more of the services nodes provides personal communications services.

76. The system as in claim 47 wherein one or more of the services nodes is part of a personal communications network.

77. A telecommunications switch which is operable as a node in an expandable telecommunications system, the switch comprising:

a nodal switch having a capacity which corresponds with a maximum number of ports which may be physically associated with the telecommunications switch; a bus for carrying data to and from the ports; and a ring IO card for transmitting and receiving packetized information over a network, the network for providing communications between the telecommunications switch and other nodes associated with the telecommunications system, whereby information, including circuit switched data, which originates from any port of the telecommunications switch is substantially continuously communicable to any other port of the telecommunications switch or any other node of the telecommunications system.

78. The telecommunications switch as in claim 77 wherein the telecommunications switch is programmable and is controllable by a host device.

79. The telecommunications switch as in claim 78 wherein the programmable telecommunications switch is operable as a server which is controlled by one or more host devices vices which are operable as clients.

80. The telecommunications switch as in claim 79 wherein the one or more host devices and the programmable telecommunications switch are connected in communicating relationship by a local area network.

81. The telecommunications switch as in claim 78 wherein the host device and the programmable telecommunications switch are connected by an asynchronous communication link.

82. The telecommunications switch as in claim 77 wherein the network operates synchronously with respect to one or more public or private networks representing the ports, and asynchronously with respect to the telecommunications switch.

83. The telecommunications switch as in claim 77 wherein the network comprises a local area network.

84. The telecommunications switch as in claim 77 wherein the network comprises a wireless communication network.

85. The telecommunications switch as in claim 77 wherein the network comprises a synchronous optical network.

86. The telecommunications switch as in claim 77 wherein the network comprises an asynchronous transfer mode network.

87. The telecommunications switch as in claim 77 wherein the network comprises a portion of a public switched telephone network.

88. The telecommunications switch as in claim 77 wherein the information transferred by the network includes packet switched data.

89. The telecommunications switch as in claim 77 wherein the packetized information transferred by the network is carried by one or more packets each of which includes control and address information and a payload portion for carrying data.

90. The telecommunications switch as in claim 89 wherein the one or more packets include dude packets of variable lengths to transfer information over the network.

91. The telecommunications switch as in claim 89 wherein the circuit switched data transferred by the network is arranged in a predetermined order within a packet, whereby the order represents address information for determining the ports to which the circuit switched data corresponds.

92. The telecommunications switch as in claim 77 wherein the telecommunications switch includes multiple nodal switches and one or more switch control circuits, the switch control circuits dynamically enabling one and only one of the multiple nodal switches to transmit circuit switched data to the bus.

93. The telecommunications switch as in claim 77 wherein the telecommunications switch is non-blocking.

94. The switch as in claim 77 further comprising one or more voice processing resources connected to the network, whereby each of the voice processing resources has access to circuit switched data which originates from any port of the system.

* * * * *